US007312899B2

(12) United States Patent
Nichogi

(10) Patent No.: US 7,312,899 B2
(45) Date of Patent: Dec. 25, 2007

(54) APPARATUS AND METHOD FOR EDITING COLORS

(75) Inventor: Mutsuko Nichogi, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1092 days.

(21) Appl. No.: 10/420,381

(22) Filed: Apr. 22, 2003

(65) Prior Publication Data

US 2004/0017586 A1 Jan. 29, 2004

(30) Foreign Application Priority Data

Apr. 23, 2002 (JP) ............................. 2002-120446
Apr. 8, 2003 (JP) ............................. 2003-103984

(51) Int. Cl.
*G06K 15/00* (2006.01)
(52) U.S. Cl. .................. 358/2.1; 358/1.9; 358/518; 358/520; 358/531; 358/3.22; 358/3.23; 382/167
(58) Field of Classification Search ............. 358/2.1, 358/1.9, 518, 520, 531, 3.22, 3.23; 382/167
See application file for complete search history.

(56) References Cited

U.S. PATENT DOCUMENTS

| 5,771,311 | A |   | 6/1998 | Arai |   |
|---|---|---|---|---|---|
| 5,793,884 | A | * | 8/1998 | Farrell | ............. 382/167 |
| 6,023,525 | A | * | 2/2000 | Cass | ............. 382/162 |
| 6,061,153 | A | * | 5/2000 | Sugita | ............. 358/518 |
| 6,888,963 | B2 | * | 5/2005 | Nichogi | ............. 382/167 |
| 2002/0012461 | A1 |   | 1/2002 | MacKinnon et al. |   |
| 2003/0161530 | A1 | * | 8/2003 | Yamada et al. | ............. 382/167 |

FOREIGN PATENT DOCUMENTS

| JP | 6-169391 | 6/1994 |
|---|---|---|
| JP | 7-162694 | 6/1995 |
| JP | 7-174631 | 7/1995 |
| JP | 8-317238 | 11/1996 |
| JP | 9-233490 | 9/1997 |

OTHER PUBLICATIONS

European Search Report corresponding to application No. EP 03-00-8789 dated Dec. 23, 2004.

(Continued)

*Primary Examiner*—Twyler Lamb
*Assistant Examiner*—Michael Burleson
(74) *Attorney, Agent, or Firm*—RatnerPrestia

(57) ABSTRACT

Disclosed is an apparatus and method for color-editing capable of simply carrying out color-editing spectral values, such as spectral reflectance, spectral transmittance, spectral radiance and spectral radiant intensity. When color-editing a spectral value of spectral image, the spectral color is transformed into a low-dimensional color space easy for the human to handle in an HLS space transforming section and color-editing and color-correction are carried out in the low-dimensional color space in on HLS color-editing section thereby generating a proper spectral value from a transformed low-dimensional color in a spectral-space inverse-transforming section. Also, a spectral color editing section receives a spectral editing instruction signal and transforms a wavelength width of a spectral color peak to a narrow one, thereby improving saturation.

33 Claims, 13 Drawing Sheets

OTHER PUBLICATIONS

Tajima, J.: "Consideration and Experiments On Object Spectral Reflectance For Color Sensor Evaluation/Calibration," Pattern Recognition, 2000. Proceedings 15th International Conference On Sep. 3-7, 2000, Los Alamitos, CA, USA, IEEE Comput. Soc, US, Sep. 3, 2000, pp. 588-591, XP010533357, ISBN: 0-7695-0750-6.

Vrhel, M.J., Et Al: "Color Correction Using Principal Components," Color Research and Application, John Wiley & Sons, Inc., New York, US, vol. 17, No. 5, Oct. 1, 1992, pp. 328-338, XP000195824, ISSN: 0361-2317.

* cited by examiner

APPARATUS AND METHOD FOR EDITING COLORS

FIELD OF THE INVENTION

This invention relates to an apparatus and method for editing color information and image comprising spectral reflectance, spectral transmittance, spectral radiance or spectral radiant intensity.

BACKGROUND OF THE INVENTION

There are various ones of utilization as apparatuses for color-image processing, including scanners, digital cameras, printers and displays. As a method to exchange image data between such apparatuses, there is transformation into color-image data wherein the color image data inputted at an input unit is once transformed into a color space not relying upon the apparatus and then outputted to an output unit. Such a system is called a color management system.

In the color management system, by establishing transformation between the signal of the image input unit and the color space not relying upon the apparatus, data can be delivered to any of the image output units. There is no need to determine color transforming processes in the number of combinations of input and output units. Meanwhile, in case the color image data inputted at the image input unit is previously transformed into a device independent color space not relying upon illumination besides upon the apparatus, it is possible to output from the output unit an image of under an illumination different from the illumination of during image input. The device independent color space not relying upon the apparatus is generally an XYZ tri-stimulus value prescribed by the International Standard Organization CIE or an L*a*b* equivalent color space.

By nature, color is expressed by a spectral radiance as to in what degree each wavelength of color is contained. The XYZ tri-stimulus value is of three scalar quantities obtainable by weighting the spectral radiance through the color-matching function as defined under the CIE and thereafter integrated in the visible portion. Meanwhile, the L*a*b* equivalent color space is a three-dimensional color space the XYZ tri-stimulus value is normalized by reference white.

Color, in nature, is 31-dimensional huge data sampled at an interval of 10 nm over a visible portion of from 400 nm to 700 nm. On the contrary, the expression form of color in three dimensions, such as XYZ tri-stimulus value or L*a*b* equivalent color space has been so far used, instead of spectral colors, as the quantity representative of a color to be perceived by the human, because of the reason the human eyes are to perceive by three types of cones.

However, by the recent improvement in information processing capability, there is a trend toward developing the apparatuses spectrally expressing colors in place of XYZ tri-stimulus values and L*a*b* equivalent color spaces. Spectral expression includes spectral reflectance, spectral transmittance, spectral radiance, spectral radiant intensity and so on. Spectral radiance contains illuminant information, because it expresses an amount of light radiated from a subject. The spectral radiance, removed of a spectral distribution of illuminant, is termed as spectral reflectance or spectral transmittance.

There is a widespread of the color management systems for handling spectral reflectance or transmittance, of spectral expressions, as a device independent color space. Namely, those are the systems which estimate a spectral reflectance or transmittance of a subject, to handle a spectral reflectance image or spectral transmittance image as an image thereof. Hereinafter, the color in spectral expression as represented by spectral reflectance or transmittance is collectively referred to as a spectral color.

The apparatuses handling spectral colors include, for example, a skin color measuring method and spectral reflection spectrum estimating method described in JP-A-7-174631 and a color simulation apparatus described in JP-A-9-233490. In these apparatus, a spectral reflectance image of a subject is estimated from an image inputted at an image input unit, in order to analyze the physical properties of the subject or simulate an image of the subject as viewed under various illuminants.

Traditionally, color editing has been conducted in the color spaces that depend to the respective apparatus such as cameras, displays, printers and the like, i.e. in the camera RGB color spaces, printer CMYK color spaces, display RGB color spaces. However, by the widespread color management systems dealing with the spectral colors, there arise the applications for color-editing or color-correcting the spectral image as independent color spaces.

The apparatuses for color-editing spectral images include, for example, a color processing apparatus described in JP-A-7-162694. According to this document, the spectral color of color sample is displayed in the form of a graph in a spectral color display window, whereby the user is allowed to directly edit a graph curve to a desired form by the use of an editor, such as "illustrator" by Adobe. Thereupon, the edited spectral color is transformed into an xy chromaticity and an HCV signal which are respectively displayed in an xy chromaticity diagram display windows and an HCV display window. The user again edits the spectral color with reference to the values in the xy chromaticity diagram display windows and HCV display window.

On the other hand, the apparatus for color-correcting spectral images, e.g. the apparatus for estimating a spectral reflectance from an image inputted at the image input unit, includes the foregoing skin color measuring method and spectral reflection spectrum estimating method described in JP-A-7-174631 and color simulation apparatus described in JP-A-9-233490.

These apparatuses carry out pincipal-component analysis of spectral reflectance and express it with basis in m-dimensions lower than 31-dimensions. Then, a coefficient m-dimensional vector is estimated from the input image data by a neural network. Next, a spectral reflectance is computed from the estimated m-dimensional vector, thereby estimating the spectral reflectance.

However, in expressing a spectral reflectance on certain basis, unless the basis contain something like a delta function narrow in wavelength width, such a color cannot be estimated. Namely, this results in an impossibility to obtain, as an estimation value, a quite saturated color having a narrow wavelength width. Consequently, the estimated image is of an image giving an expression comparatively low in saturation. For this reason, there is a desire for an approach to color-correct an estimated spectral image into a more saturated color. However, there exist no systems for making color-correction in the spectral image.

In the conventional spectral-image color-editing apparatus, the human is required to directly modify the shape of spectral-color curves as huge as 31-dimensions. In what degree the color is changed by what way correction is done, is the operation not easy to understand and hence difficult, despite of the capability to utilize guidance including XYZ signals, L*a*b* signals or HCV signals.

SUMMARY OF THE INVENTION

It is an object of the present invention to provide an apparatus and method for editing colors, in a space easy for the human to understand, for the spectral values such as spectral reflectance, spectral transmittance, spectral radiance and spectral radiant intensity.

Also, it is another object to provide an apparatus and method for editing colors capable of color-correcting an estimated spectral image into a more saturated color.

In the present invention, when color-editing a spectral value, the spectral value is transformed into a color space easy for the human to handle so that colors can be edited in the color space, thereby generating a suitable spectral value from a transformed color space. Also, in the case color editing is to improve saturation, the wavelength form of spectral value is transformed into a form having a narrow wavelength width.

DESCRIPTION OF THE EXEMPLARY EMBODIMENT

Exemplary embodiments of the present invention are demonstrated hereinafter with reference to the accompanying drawings.

1. First Exemplary Embodiment

Figure 1:
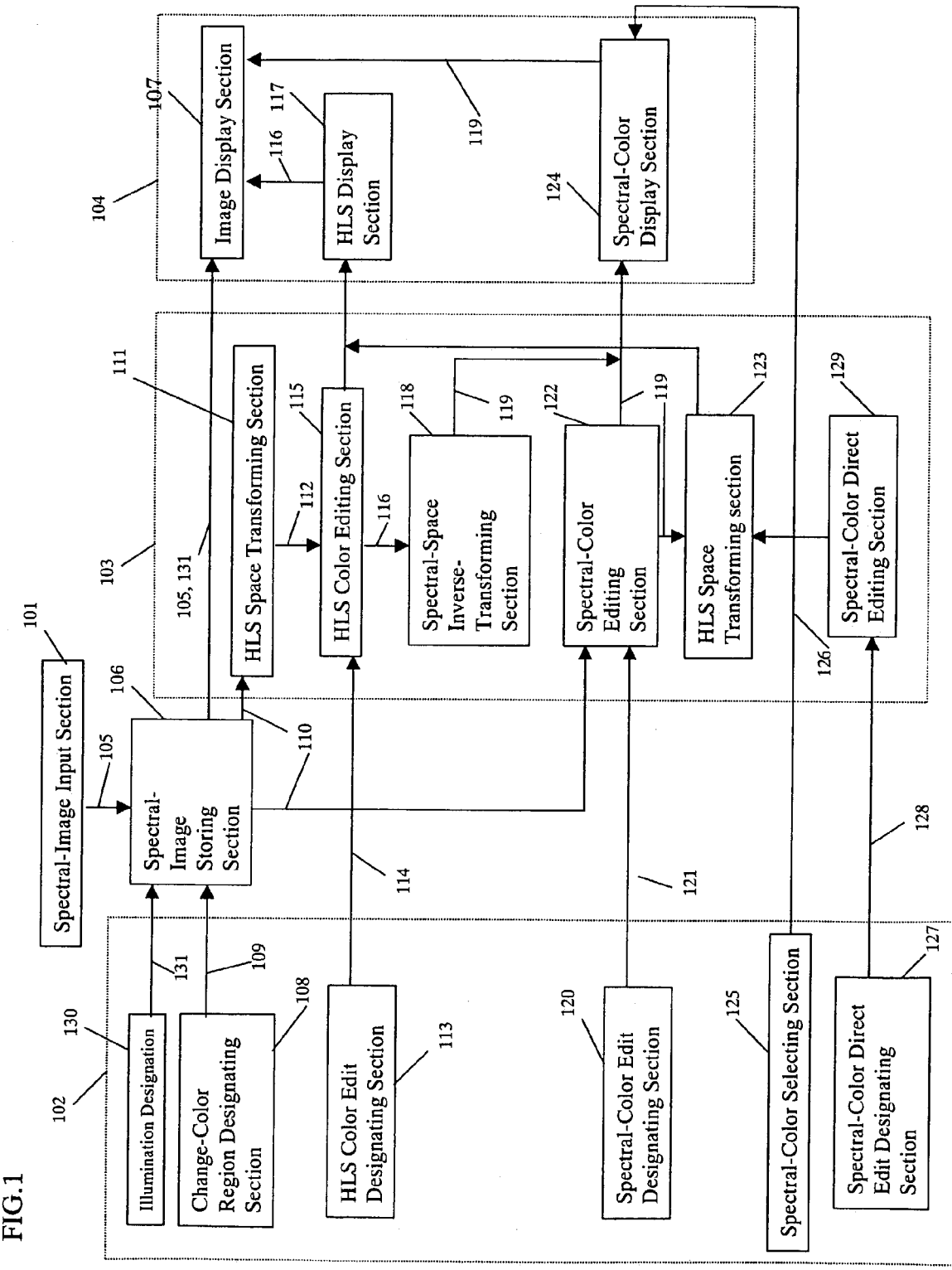
FIG. 1 is a block diagram of a color-editing apparatus according to embodiment 1 of the present invention.

FIG. 1 is a block diagram of a color-editing apparatus for spectral images according to embodiment 1 of the present invention. The color-editing apparatus is configured with a spectral image input section 101 for inputting a spectral image, a user interface section 102 for carrying out a spectral image editing, a color-editing section 103 for receiving an instruction from the user interface section 102 and carrying out a color-editing, a display section 104 for displaying a color space coordinate value and spectral image as a result of the editing by the color-editing section 103, and a spectral-image storing section 106 for storing an input spectral image 105.

The user interface section 102 is configured with a change-color region designating section 108 for designating a region the user desires to change the color, an HLS-color-edit designating section 113 as an interface for the user to edit a color in HLS space representation, a spectral-color edit designating section 120 as an interface for directly editing a spectral color 110 inputted by the user, a spectral-color selecting section 125 as an interface for the user to select, when there are a plurality of outputs of the spectral-space inverse-transforming section 118 and a plurality of spectral colors are displayed on a spectral-color display section 124, any of them, an illumination designating section 130, and a spectral-color direct edit designating section 127 for the user to directly operate the values of spectral colors and output a designation.

The color-editing section 103 is configured with an HLS space transforming section 111 for transforming a to-be-changed spectral color 110 into a three-dimensional color space of hue, lightness and saturation (HLS), an HLS-color-editing section 115 for edit-processing a color 112 in HLS representation inputted according to an HLS edit instruction 114 by the user, a spectral-space inverse-transforming section 118 for transforming a post-edit HLS-color into a spectral value, a spectral-color editing section 122 for edit-processing a spectral color 110 according to a spectral-color edit instruction 121, an HLS space transforming section 123 for transforming a post-edit spectral color 119 into a color value in HLS space representation, and a spectral-color direct editing section 129 for reflecting a user's direct edit instruction for a spectral color.

The display section 104 is configured with an image display section 107 for displaying a spectral image reflected with an input spectral image 105 and edited color, an HLS display section 117 for displaying a color in HLS representation, and a spectral-color display section 124 for displaying a color in spectral representation.

Figure 2:
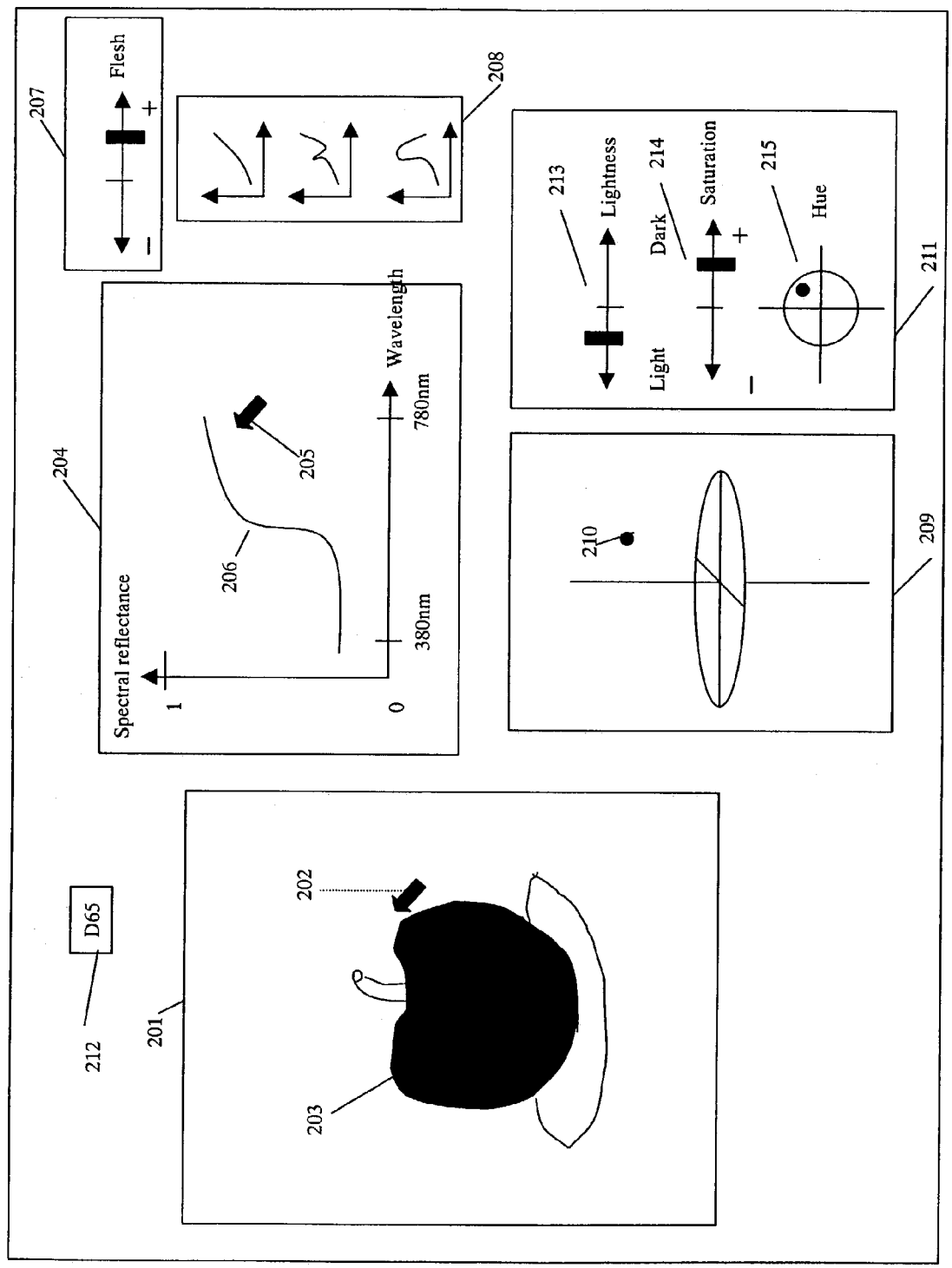
FIG. 2 is a concept diagram showing a display example of the color-editing apparatus according to embodiment 1 of the invention.

Now, the operation of the color-editing apparatus of FIG. 1 is explained together with FIG. 2. The below explanation is on a case using an HLS (hue, lightness, saturation) space as an example of color space easy for the human to handle. Accordingly, in FIG. 2, an HLS display window 209 is provided as a corresponding-color display section for displaying an HLS-color corresponding to an input spectral value, and an HLS-color-edit designate 211 is provided as a user's color-editing section.

At first, a spectral image 105 to be color-edited is inputted at the spectral-image input section 101 and stored to the spectral-image storing section 106. Although the present embodiment exemplifies a spectral reflectance as a spectral image, the similar method can be applied for spectral radiance, spectral radiant intensity or spectral transmittance.

The spectral reflectance stored in the spectral-image storing section 106 is multiplied by an illumination spectral distribution designated by the illumination designating section 130 and transformed into a spectral radiance. This is further processed taking account of color characteristics of the display, and then displayed as a spectral image 201 of FIG. 2 on the image display section 107.

The user instructs what region or pixel he or she desires to make a color-editing in the spectral image 105, by the change-color region designating section 108. Specifically, in case the spectral image 201 is dragged by a change-color region designating cursor 202, a change-color region signal 109 designating a relevant region or pixel is issued from the change-color region designating section 108 and read as a change-color region 203 into the spectral-image storing section 106. The user, upon designating a region, designates also a pixel to be considered a representative color within the region.

The spectral color 110, an output of the spectral-image storing section 106, is a 31-dimensional vector value sampled at an interval of 10 nm over a visible portion of 380 nm to 780 nm on the designated pixel or designated region pixel. This is inputted to the spectral-color editing section 122. Then, the spectral color of the designated pixel, or representative pixel in the designated region, is displayed as a spectral color 206 for the spectral-color display window 204 of FIG. 2 on the display.

The spectral color 110 is further inputted also to the HLS space transforming section 111. The HLS space transforming section 111 transforms the spectral color into an HLS space, a lower-dimensional color space, and outputs an HLS-color 112. The outputted HLS-color 112 is displayed, as an HLS-color 210 in HLS display 209 of FIG. 2, on the display through the HLS-color editing section 115 and the HLS display section 117.

HLS refers to a coordinate system representative of a hue (H), lightness (L) and saturation (S). Although various color spaces are used for representing HLS, assumably used herein is a hue, saturation and lightness in an L*a*b* uniform color space. Equation 1 shows a transforming formula of from a spectral reflectance into an HLS. By these, an XYZ tri-stimulus value is first determined. Then, L*a*b* is determined from the XYZ tri-stimulus value.

$$X = K \int r(\lambda) S(\lambda) x(\lambda) d\lambda, Y = K \int r(\lambda) S(\lambda) y(\lambda) d\lambda, Z = K \int r(\lambda) S(\lambda) z(\lambda) d\lambda$$

$$K = 100 / \int S(\lambda) y(\lambda) d\lambda$$

$$L^* = 116 (Y/Yn)^{1/3} - 16$$

$$a^* = 500[(X/Xn)^{1/3} - (Y/Yn)^{1/3}]$$

$$b^* = 200[(Y/Yn)^{1/3} - (Z/Zn)^{1/3}]$$

$$L = L^*$$

$$H = \tan^{-1}(b^*/a^*)$$

$$S = \sqrt{a^{*2} + b^{*2}} \qquad \text{Equation 1}$$

In Equation 1, $r(\lambda)$ is a spectral radiance obtained by multiplying a spectral reflectance by a spectral color of an illumination 131 designated by the illumination designating section 130, $S(\lambda)$ is a spectral distribution of a D65 illumination, $x(\lambda)$, $y(\lambda)$ and $z(\lambda)$ are color functions such as 2-degree field of view as prescribed by the CIE, (X, Y, Z) is a tri-stimulus value calculated from a spectral radiance. Also, (L, H, S) is an HLS value to be determined, (L*, a*, b*) is a color in CIE L*a*b* space to be used for determining (L, H, S), and (Xn, Yn, Zn) is a media reference white, i.e. an XYZ tri-stimulus value of the illumination.

By the above process, a to-be-changed color is first displayed in two kinds of color spaces of a spectral color and an HLS-color, on the display of FIG. 2.

Now, explanation is made on a case to edit a current spectral color on display. Editing the waveform in the spectral color display windows 204 of FIG. 2 by the use of a spectral-color direct editing cursor 205, the user directly edit multi-dimensional information of from 380 nm to 780 nm.

Editing with the spectral-color direct editing cursor 205, causes an output of a spectral direct edit instruction signal 128, a signal from the spectral-color direct edit designating section 127 in FIG. 1. This is inputted to the spectral-color direct editing section 129. In the spectral-color direct editing section 129, the current spectral color 110 is processed as per an edit instruction and then outputted as a post-edit spectral color 119.

Then, the post-edit spectral color 119 is displayed in place of the current spectral color 110 on the spectral-color display 204 of the display by the spectral color display section 124. In this case, if there are a plurality of outputs of the spectral-space inverse-transforming section 118 and a plurality of spectral colors are displayed on the spectral-color display section 124, the user is able to select which spectral-color may be edited by operating the spectral-color selecting section 125. The spectral-color selecting section 125 outputs a spectral-color select designation signal 126 to the spectral-color display section 124, and a spectral-color to be edited is selected. The post-edit spectral color 119 is transformed into an HLS-color space by the HLS space transforming section 123, and displayed as an HLS-color 210 of the pixel designated by the user in the HLS display window 209 of the display through the HLS display section 117.

In the case a change-color is designated as a region, the editing of a representative color is exerted similarly to the spectral color on the other pixels within the region. This rewrites the color in the change region of the spectral image 201 into a post-edit color.

In the meanwhile, it is not easy for the human to understand a method that the user directly edits multi-dimensional information. Consequently, in the present invention, the below method enables the human to edit a spectral color in a color space the human is allowed to easily manipulate a color. The detail of the editing method is explained.

The HLS display window 209 of FIG. 2 displays a current HLS-color 210. Herein, the HLS-color is dragged by a mouse to a preferred HLS coordinate value. Otherwise, by the HLS-color edit designate 211, the bar on each HLS axis, (lightness, saturation, hue) may be moved. The HLS-color edit designate 211 is provided for the user to make a color-editing on the HLS space. By changing the respective bars 213-215 on lightness, saturation and hue, a signal reflecting the change amount is issued from the HLS-color edit designating section 113. For example, when desiring a more saturated one, the saturation bar is moved in + direction. When a change-color is designated as a region, by editing a representative color in this way, the editing content can be similarly exerted to the HLS values of the other pixels within the region.

Explanation is made on the method for realizing the above-discussed operation over the block diagram of FIG. 1. In FIG. 1, the editing information prepared in the HLS space by the user is outputted as an HLS edit designation 114 from the HLS-color edit designating section 113 to the HLS-color editing section 115. In the HLS-color-editing section 115, the color is actually changed, i.e. the display of a spectral image 201 and HLS display window 209 is rewritten through the HLS display section 117. Simultaneously, a post-edit HLS-color 116 is inputted to the spectral space inverse-transforming section 118 where it is inverse-transformed into a spectral color. This rewrites the spectral color 206 in the spectral-color display window 204 of the display.

In this case, the post-edit HLS-color 116 is three-dimensional information whereas the spectral color is in 31-dimensions. This results in an ill-condition problem that the operation of the spectral-space inverse-transforming section 118 is not to be determined unambiguously. For this reason, the spectral-space inverse-transforming section 118 displays a plurality of calculated solutions in the spectral-selection display window 208. In case the user selects a desired one out of a plurality of spectral colors on display, it is provided as a post-edit spectral color 119 to be displayed in the spectral-color display window 204.

By the above operation, the user is allowed to edit a spectral image color in a three-dimensional space easy for the human to recognize. However, because the HLS value varies depending upon a designated illumination, the edit process is carried out while making sure of the colors under a certain number of illuminations by the illumination select window 212.

The color edit process by the user is preferably carried out by previously editing an image color in the HLS spaces under a certain number of illuminations and making a spectrally fine adjustment on it by the spectral-color direct edit cursor 205.

Now, explanation is made in detail on the operation of the spectral-space inverse-transforming section 118 as a feature of the invention. There are a plurality of algorisms for spectral-space inverse-transformation. These may be set up on the system, to output an output result of the algorism to the spectral selection display window 208 thus allowing for user's selection. Otherwise, any one kind of algorisms may be operated previously.

The first inverse-transforming method is to select a closet one of spectral colors obtained from post-edit HLS-colors 116 to a pre-edit spectral color distribution. The closeness in distance to a pre-edit spectral color may be taken as a constraint, to select a spectral color that Equation 2 is minimized.

$$\min\left(s_a(\lambda_i) i = 1, \ldots, \quad 31 \left| \sqrt{(H_{target} - Ha)^2 + (L_{target} - La)^2 + (S_{target} - Sa)^2} + \alpha \sum_{\lambda=1}^{31}(s_b(\lambda) - s_a(\lambda))^2 \right.\right)$$

$s_b(\lambda)$ is a pre-edit spectral color, $s_a(\lambda)$ is a post-edit spectral color, (Ha, La, Sa) is an HLS value calculated from $s_a(\lambda)$, and ($H_{target}$, $V_{target}$, $C_{target}$) is a post-edit HLS value designated by the user. $\alpha$ is a scalar coefficient, to be previously determined.

Otherwise, Equation 2 may be further added with a constraint that a to-be-determined spectral color is in a smooth form. Namely, the condition that $s_a(\lambda)$ has a secondary differential approximate to 0 is accounted for. In this case, the spectrum has a secondary differential as given by Equation 3.

$$\Delta s_a(\lambda_i) = \{s_a(\lambda_{i+1}) - s_a(\lambda_i)\} - \{s_a(\lambda_i) - s_a(\lambda_{i-1})\} = s_a(\lambda_{i+1}) - 2s_a(\lambda_i) + s_a(\lambda_{i-1}) \quad \text{Equation 3}$$

In Equation 3, $\Delta s_a(\lambda)$ is a secondary differential value of a spectrum $s_a(\lambda_i)$ at a wavelength I. The square sum of Equation 3 is given by Equation 4, which represents a smoothness of spectrum.

$$\sum_{i=2}^{30} \{\Delta s_a(\lambda_i)\}^2 \quad \text{Equation 4}$$

Tingeing Equation 4 to Equation 2 provides Equation 5. $s_a(\lambda)$ minimizing Equation 5 may be determined. $\alpha$, $\beta$ in Equation 5 are coefficients reflecting conditional importance of the conditions.

$$\min\left(s_a(\lambda_i), i = 1, \ldots, \quad 31 \left| \sqrt{(H_{target} - Ha)^2 + (L_{target} - La)^2 + (S_{target} - Sa)^2} + \alpha \sum_{i=1}^{31}(s_b(\lambda_i) - s_a(\lambda_i))^2 + \beta \sum_{i=2}^{30}\{\Delta s_a(\lambda_i)\}^2 \right.\right) \quad \text{Equation 5}$$

For calculating $s_a(\lambda)$ minimizing these equations, determination is by the existing optimizing scheme, e.g. the simplex method. In this case, the coefficients $\alpha$, $\beta$ are previously determined. Otherwise, $\alpha$ and $\beta$ are taken as undetermined coefficients, to solve by the Lagrange's method of undetermined coefficients.

Figure 3:
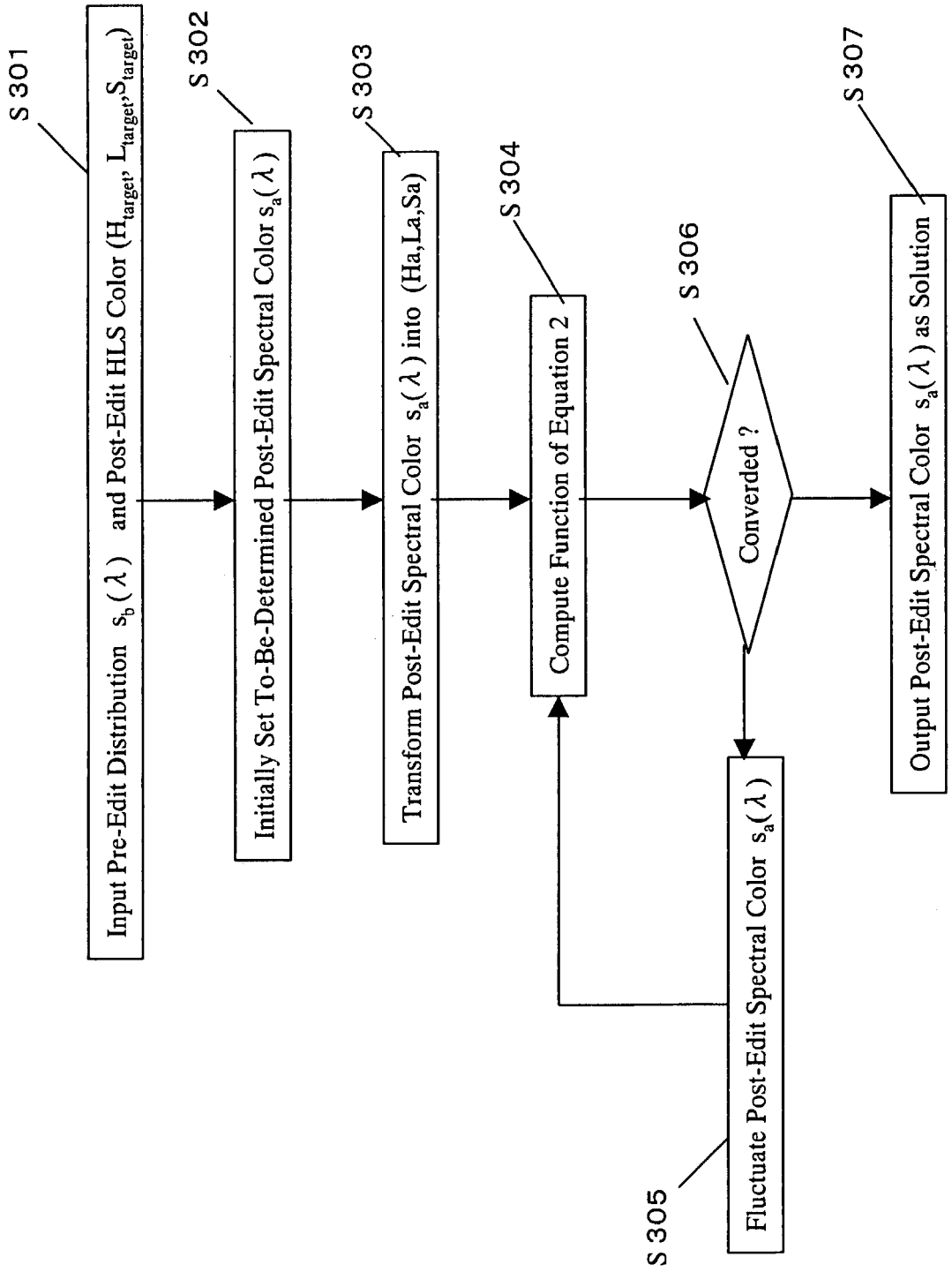
FIG. 3 is a flowchart showing a procedure for a spectral space inverse-transforming method according to embodiment 1 of the invention.

FIG. 3 shows a computation procedure according to this method. FIG. 3 explains on an example to determine $s_a(\lambda)$ minimizing Equation 2 by the optimization approach. In step 301, inputted are a pre-edit spectral color and a post-edit HLS-color. In step 302, set is an initial value of a to-be-determined post-edit spectral color $s_a(\lambda)$. In step 303, (Ha, La, Sa) is determined from the post-edit spectral color $s_a(\lambda)$ by Equation 1. In step 304, the value of the function in Equation 2 is determined. In step 305, the post-edit spectral color $s_a(\lambda)$ is fluctuated in its value. The method of fluctuation differs depending upon the existing optimization approaches. The above steps are repeated until determining a convergence in step 306. The determination of convergence differs depending upon the existing optimization approaches. If converged, the post-edit spectral color $s_a(\lambda)$ at that time is outputted as a solution.

As in the above, the color-space inverse-transforming section 118 output, as a new spectral value, a spectral value smallest in spectral Euclidean distance to a pre-edit spectral value, thereby effecting inverse transformation.

The second inverse-transforming method is on a speed-increased version to the first inverse-transforming method. The first inverse-transforming method took, as variables, values of 31-dimensional spectral vectors, to determine a value minimizing the equation. However, determination by the optimization approach takes longer time in convergence with increase in the number of variables. Also, because the variables are varied independently, there is a possibility to make the spectral form unnatural.

Figure 4:
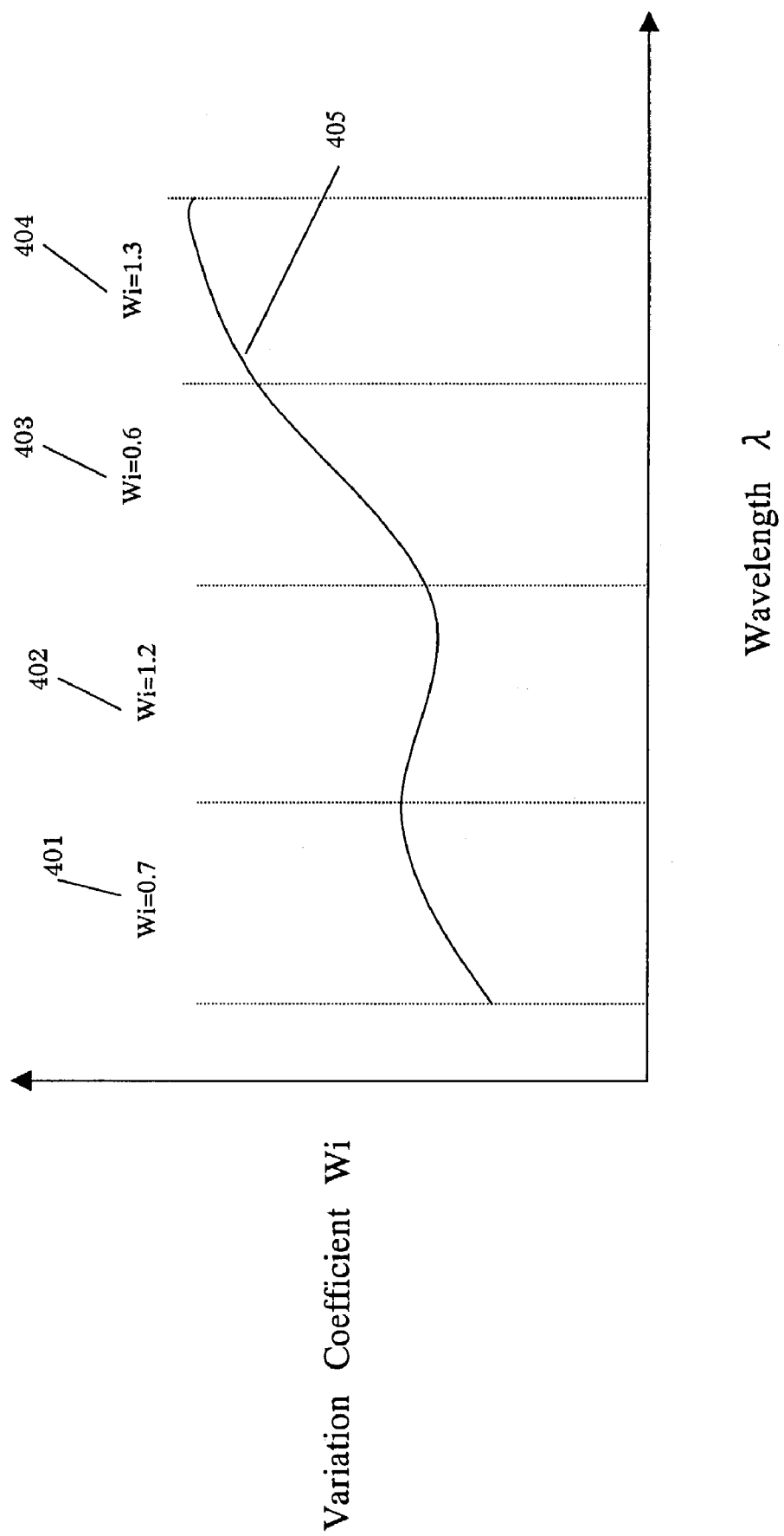
FIG. 4 is a graph of a change coefficient in the spectral space inverse-transforming method according to embodiment 1 of the invention.
Figure 5:
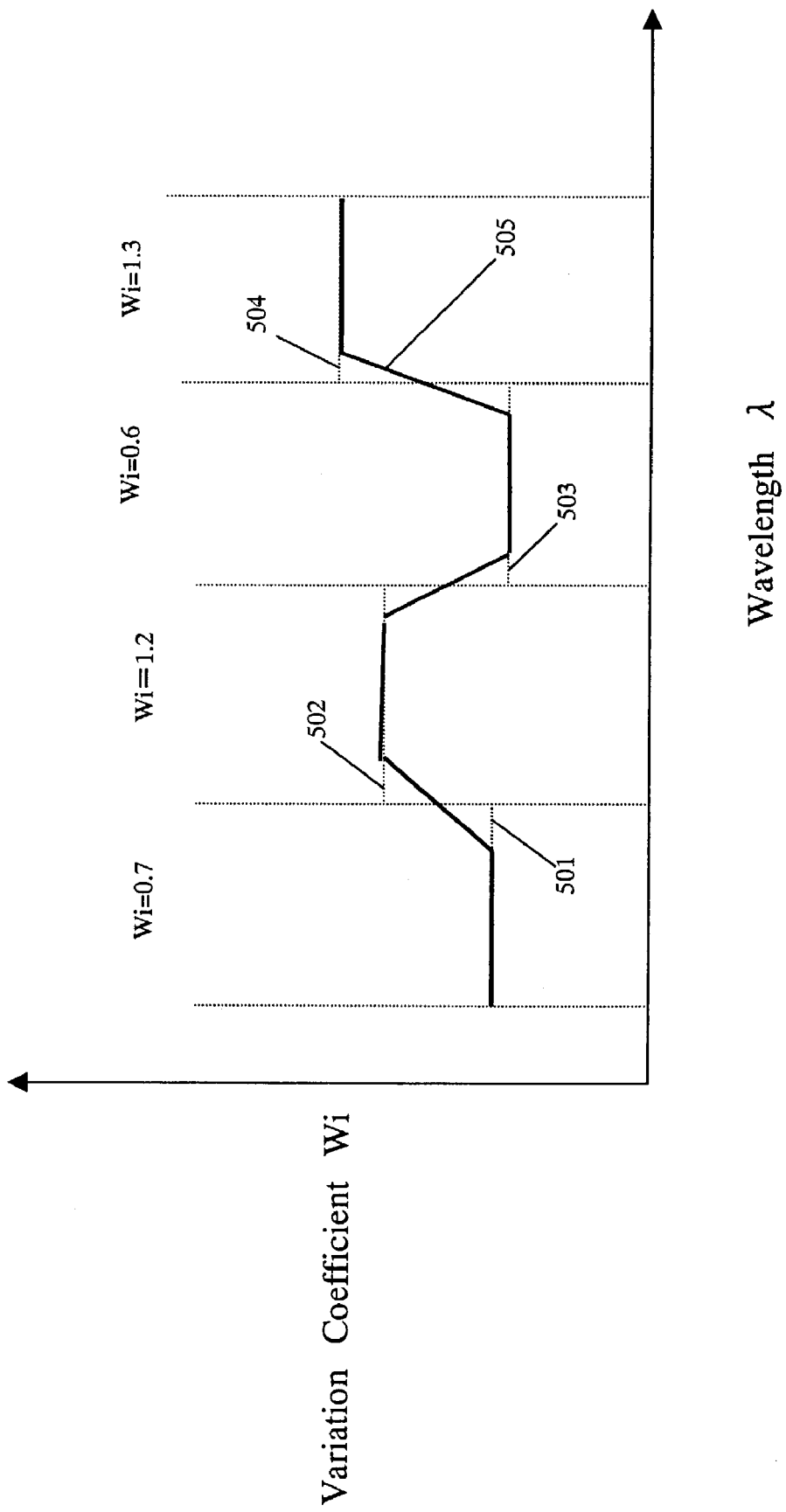
FIG. 5 is a graph of a change function in the spectral space inverse-transforming method according to embodiment 1 of the invention.

Consequently, in the second method, the spectrum is divided into a certain number of wavelength regions as shown in FIG. 4, to thereby set a variable coefficient for each region. FIG. 4 is the case of division into four regions. In FIG. 4, curve 405 designates a pre-edit spectral color $s_b(\lambda)$, and numbers 401-404 in each region designates a variation coefficient $W_i$ in each region. The variation coefficient $W_i$ is linearly interpolated at both ends of each region in order for smooth connection of variable coefficient, as shown in FIG. 5, thereby determining a variation function. In FIG. 5, broken lines 501, 502, 503 and 504 are variation coefficient $W_i$ in each region, and solid line 505 is variation function $w_{eight}(\lambda)$. The obtained variation function is multiplied on each wavelength value of pre-edit spectral color $s_b(\lambda)$, to have a candidate for a to-be-determined post-edit spectral color $s_a(\lambda)$. With this method, the variables to be optimized is satisfactorily in the number of variation coefficients, i.e. four in the FIG. 4 case. Furthermore, because the variation function is determined and multiplied on the spectral colors to make the variation coefficients continuous, it is possible to compute a not-unnatural spectral color the former spectral color form is saved to a possible extent. The equation to be minimized is Equation 6.

$$\min(W_i, i=1,\ldots,4| \sqrt{(H_{target}-Ha)^2+(L_{target}-La)^2+(S_{target}-Sa)^2}) \quad \text{Equation 6}$$

Equation 6 may be added with constraints as those shown in Equations 4 and 5.

Figure 6:
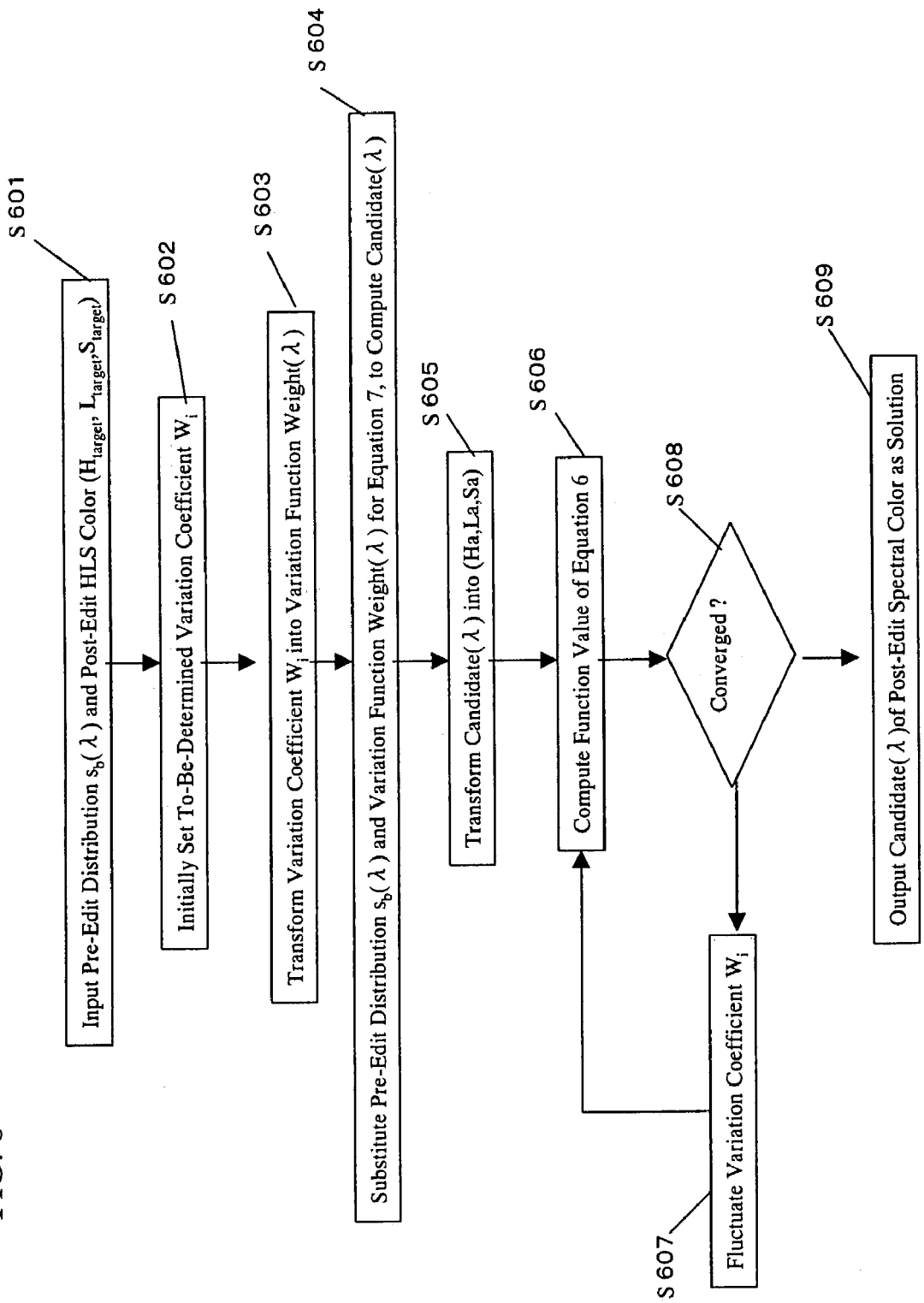
FIG. 6 is a flowchart showing a second procedure for a spectral space inverse-transforming method according to embodiment 1 of the invention.

The computation procedure by this approach is shown in FIG. 6. In step 601, inputted are a pre-edit spectral color $s_b(\lambda)$ and a post-edit HLS-color ($H_{target}$, $L_{target}$, $S_{target}$). In step 602, set is an initial value of variation coefficient Wi. In step 603, a variation function Weight($\lambda$) is computed from the variation coefficient $W_i$. In step 604, Candidate($\lambda$) as a candidate for a post-edit spectral color is determined from the variation function Weight($\lambda$) and pre-edit spectral color $s_b(\lambda)$ by Equation 7.

$$\text{Candidate}(\lambda)=(\text{Weight}(\lambda_1)*s_b(\lambda_1),\ldots,\text{Weight}(\lambda_{31})*s_b(\lambda_{31})) \quad \text{Equation 7}$$

In step 605, the Candidate($\lambda$) is transformed into an HLS-color space to have (Ha, La, Sa). In step 606, determined is a functional value of Equation 6. In step 607, the variation coefficient is fluctuated in value. The method of fluctuation differs depending upon the existing optimization approaches. The above steps are repeated until determining a convergence in step 608. The determination of convergence differs depending upon the existing optimization approach. If converged, the Candidate($\lambda$) at that time is outputted as a solution $s_a(\lambda)$.

Now, explanation is made on the third inverse-transforming method. In this method, an XYZ tri-stimulus value ($X_{target}$, $Y_{target}$, $Z_{target}$) is first determined from the post-edit HLS-color ($H_{target}$, $V_{target}$, $C_{target}$), to determine a spectral color satisfying this. The XYZ tri-stimulus value and the spectral color have a relationship as shown in Equation 8.

$$X=K\int r(\lambda)S(\lambda)x(\lambda)d\lambda, Y=K\int r(\lambda)S(\lambda)y(\lambda)d\lambda, Z=K\int r(\lambda)S(\lambda)z(\lambda)d\lambda$$

$$K=100/\int S(\lambda)y(\lambda)d\lambda \quad \text{Equation 8}$$

In Equation 8, $x(\lambda)$, $y(\lambda)$, $z(\lambda)$ are the color matching functions prescribed by the CIE, $S(\lambda)$ is a spectral color of standard light D65, and $r(\lambda)$ is a spectral color value of the subject. Equation 8, if discretely expressed, provides Equation 9.

$$\begin{pmatrix} X \\ Y \\ Z \end{pmatrix} = \begin{pmatrix} x(\lambda_1)S(\lambda_1) & \cdots & x(\lambda_{31})S(\lambda_{31}) \\ y(\lambda_1)S(\lambda_1) & \cdots & y(\lambda_{31})S(\lambda_{31}) \\ z(\lambda_1)S(\lambda_1) & \cdots & z(\lambda_{31})S(\lambda_{31}) \end{pmatrix} \begin{pmatrix} r(\lambda_1) \\ \vdots \\ r(\lambda_{31}) \end{pmatrix} \quad \text{Equation 9}$$

In Equation 9, it is satisfactory to determine $r(\lambda)$ satisfying the ($X_{target}$, $Y_{target}$, $Z_{target}$).

In solving Equation 9, the known is the three dimensions of ($X_{target}$, $Y_{target}$, $Z_{target}$) whereas a to-be-determined spectral color is 31-dimensional, wherein there is an ill-condition problem that unknown number is greater than the known number. There are several methods for solving such an ill-condition problem.

The first one is the method for solving by Equation 10.

$$\begin{pmatrix} r(\lambda_1) \\ \vdots \\ r(\lambda_{31}) \end{pmatrix} = \begin{pmatrix} x(\lambda_1)S(\lambda_1) & \cdots & x(\lambda_{31})S(\lambda_{31}) \\ y(\lambda_1)S(\lambda_1) & \cdots & y(\lambda_{31})S(\lambda_{31}) \\ z(\lambda_1)S(\lambda_1) & \cdots & z(\lambda_{31})S(\lambda_{31}) \end{pmatrix}^+ \begin{pmatrix} X \\ Y \\ Z \end{pmatrix} \quad \text{Equation 10}$$

where, the mark + is a Moore-Penrose generalized inverse matrix. The generalized inverse matrix provides an inverse matrix with respect to a non-square matrix in an approximate fashion. This corresponds to obtaining a solution satisfying the constraint of norm being minimum among a plurality of existing solution candidates.

The second is the method that to-be-determined $r(\lambda)$ is previously expressed in the same dimensions as the known number, i.e. three basis functions, to determine a coefficient to the basis functions. With this method, a solution is to be unambiguously determined because the known number and the unknown number are in the same dimensions.

Figure 7:
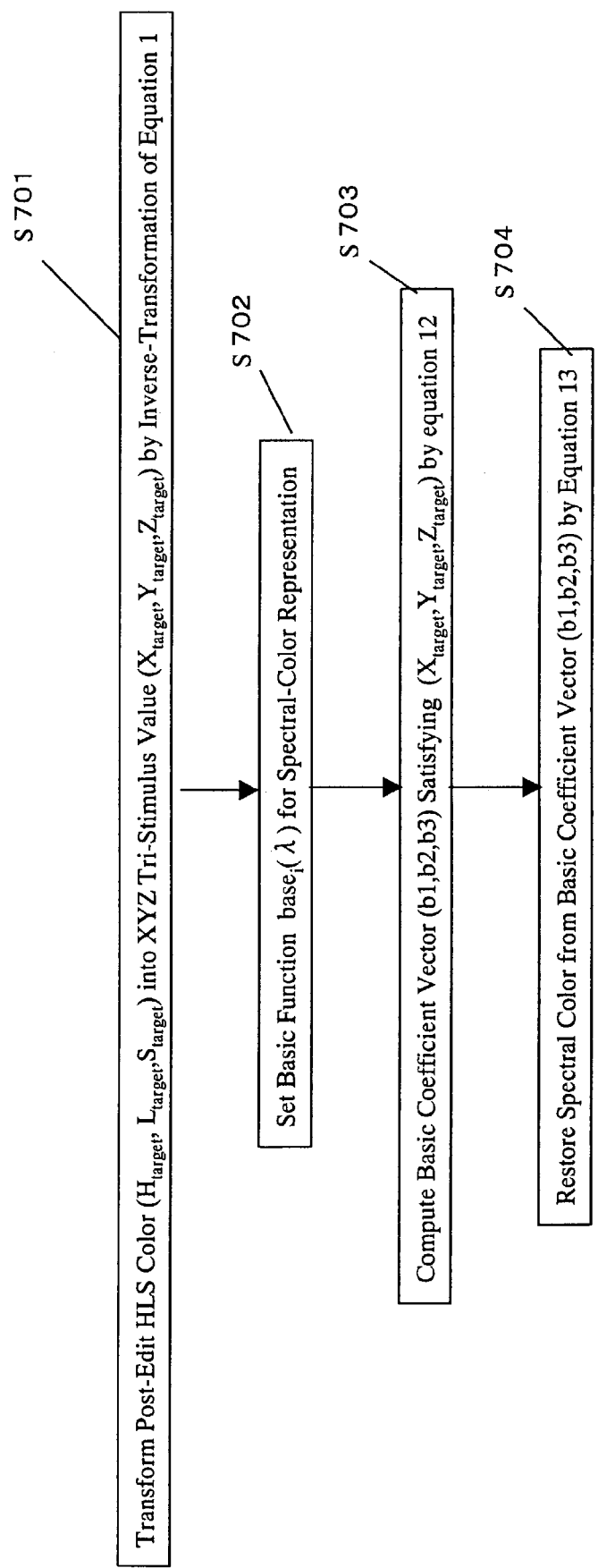
FIG. 7 is a flowchart showing a third procedure for a spectral space inverse-transforming method according to embodiment 1 of the invention.

Now, the procedure is explained by using FIG. 7. In step 701, an XYZ tri-stimulus value ($X_{target}$, $Y_{target}$, $Z_{target}$) is determined from a post-edit HLS-color ($H_{target}$, $V_{target}$, $C_{target}$) by the inverse transformation of Equation 1. In step 702, three basis functions are previously set that are suited in expressing a spectral color. The basis function is generally determined, for example, by conducting principal-component-analysis through a spectral color database of various objects existing in the natural field and taking upper-ranking three vectors as basic functions. These basis functions are assumably given base1 ($\lambda$), base2 ($\lambda$) and base3 ($\lambda$). By the basic functions, Equation 9 can be rewritten into Equation 11.

$$\begin{pmatrix} X \\ Y \\ Z \end{pmatrix} = \begin{pmatrix} x(\lambda_1)S(\lambda_1) & \cdots & x(\lambda_{31})S(\lambda_{31}) \\ y(\lambda_1)S(\lambda_1) & \cdots & y(\lambda_{31})S(\lambda_{31}) \\ z(\lambda_1)S(\lambda_1) & \cdots & z(\lambda_{31})S(\lambda_{31}) \end{pmatrix}$$

$$\begin{pmatrix} base1(\lambda_1) & base2(\lambda_1) & base3(\lambda_1) \\ \vdots & \vdots & \vdots \\ base1(\lambda_{31}) & base2(\lambda_{31}) & base3(\lambda_{31}) \end{pmatrix} \begin{pmatrix} b_1 \\ b_2 \\ b_3 \end{pmatrix} \quad \text{Equation 11}$$

In step 703, Equation 11 is solved. To solve Equation 11, it may be deformed to Equation 12. By Equation 12, three-dimensional basis coefficient vectors (b1, b2, b3) are determined.

$$\begin{pmatrix} b_1 \\ b_2 \\ b_3 \end{pmatrix} = \begin{pmatrix} x(\lambda_1)S(\lambda_1) & \cdots & x(\lambda_{31})S(\lambda_{31}) \\ y(\lambda_1)S(\lambda_1) & \cdots & y(\lambda_{31})S(\lambda_{31}) \\ z(\lambda_1)S(\lambda_1) & \cdots & z(\lambda_{31})S(\lambda_{31}) \end{pmatrix}$$

$$\begin{pmatrix} base1(\lambda_1) & base2(\lambda_1) & base3(\lambda_1) \\ \vdots & \vdots & \vdots \\ base1(\lambda_{31}) & base2(\lambda_{31}) & base3(\lambda_{31}) \end{pmatrix}^{-1} \begin{pmatrix} X \\ Y \\ Z \end{pmatrix}$$

Equation 12 where −1 means a usual inverse matrix.

In step 704, the basis function is transformed into a spectral color r(λ) by Equation 13. The obtained spectral color is a to-be-determined post-edit spectral color satisfying ($X_{target}$, $Y_{target}$, $Z_{target}$).

$$\begin{pmatrix} r(\lambda_1) \\ \vdots \\ r(\lambda_{31}) \end{pmatrix} = \begin{pmatrix} base1(\lambda_1) & base2(\lambda_1) & base3(\lambda_1) \\ \vdots & \vdots & \vdots \\ base1(\lambda_{31}) & base2(\lambda_{31}) & base3(\lambda_{31}) \end{pmatrix} \begin{pmatrix} b_1 \\ b_2 \\ b_3 \end{pmatrix}$$

Equation 13

Now, explanation is made on an approach for enhancing color saturation, as a second feature of the invention into a spectral form narrow in wavelength width, by changing a spectral color.

The spectral purity designate window 207 in FIG. 2 is a designate (window) as a color-purity editing section to be used where the user desires to edit the color purity of a spectral color 206 into a more saturated spectral form. By moving the bar in + or − direction by using the designate window 207, a signal reflecting the moving amount is issued from the spectral-color edit designating section 120. In case the user designates the bar in a direction toward the saturated color, the spectral color is narrowed at its peak wavelength width, thereby enabling to increase the saturation of color. This operation is realized on the block diagram of FIG. 1, as follows. The amount of user's designation in the spectral-purity designate window 207 provides a designation as a spectral edit designating signal 121 representative of an edit signal of spectral color as designated on the spectral-color edit designating section 120. The spectral-color editing section 122 receives a spectral edit designating signal 121 and narrows a peak wavelength width of spectral color depending upon a designation amount. The spectral color after change is displayed as a post-edit spectral color 119 in the form of a spectral color 206 in the spectral-color display window 204 of the display through a spectral information display section 124.

Simultaneously, the post-edit spectral color 119 is inputted to the HLS-space transforming section 123 and transformed into an HLS space. The obtained HLS value is displayed in the HLS display window 209 of the display through the HLS display section 117.

Figure 8:
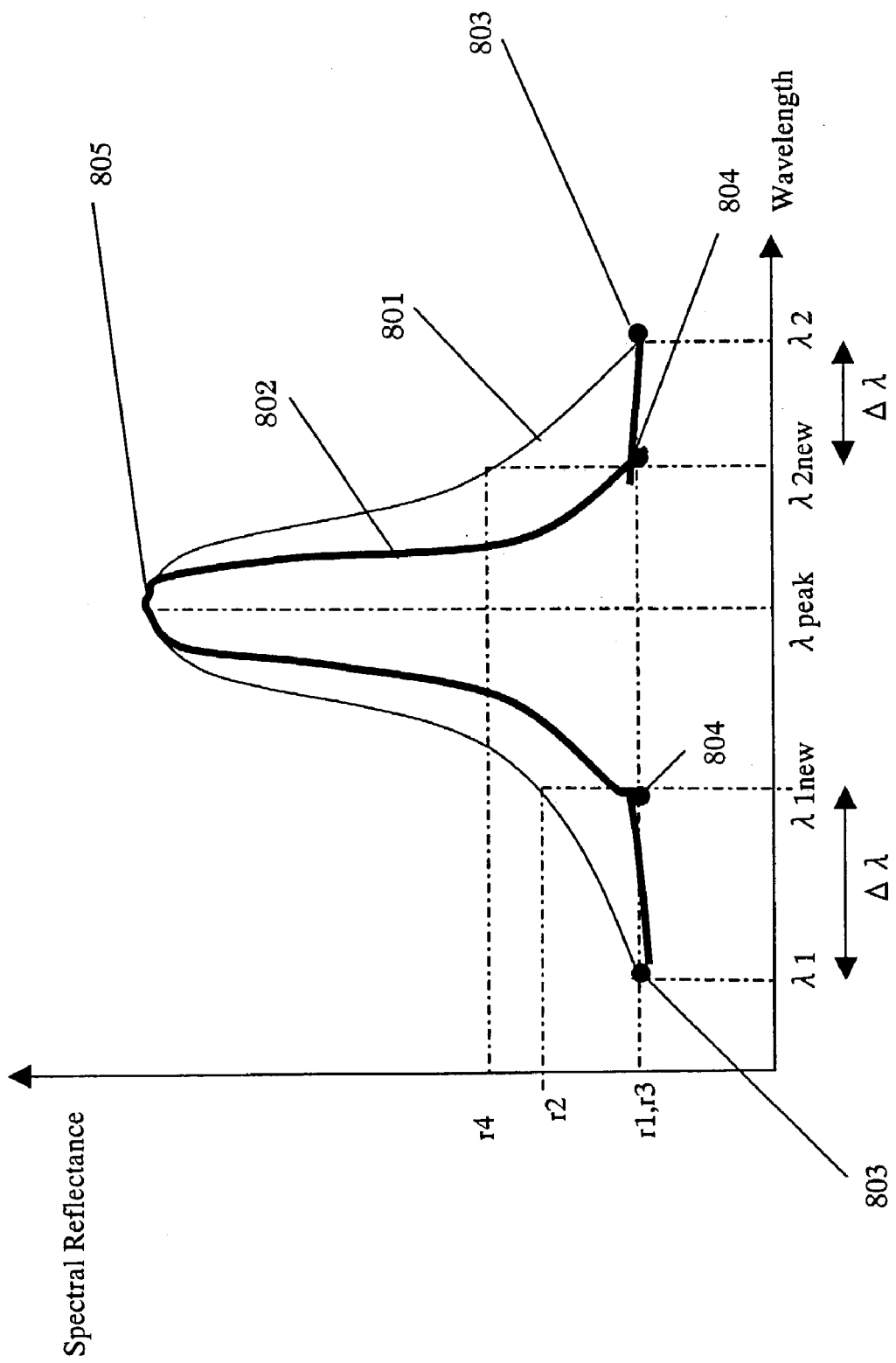
FIG. 8 is a graph explaining the operation of a spectral color-editing method according to embodiment 1 of the invention.

Now, explanation is made on the operation of the spectral-color editing section 122. The color high in saturation has a spectral-color form comparatively narrow in wavelength width. This is called high purity. Accordingly, when to raise the saturation of a certain spectral color, a spectral-color peak 805 (wavelength is $\lambda_{peak}$) may be detected as shown in FIG. 8 and processed to narrow the wavelength width at the peak. In FIG. 8, a curve 801 designates pre-edit spectral color curve, and a curve 802 designates post-edit spectral color. The wavelength width in pre-edit spectral color curve 801 and post-edit spectral color 802 are defined by wavelength-width defining points 803 and 804.

Figure 9:
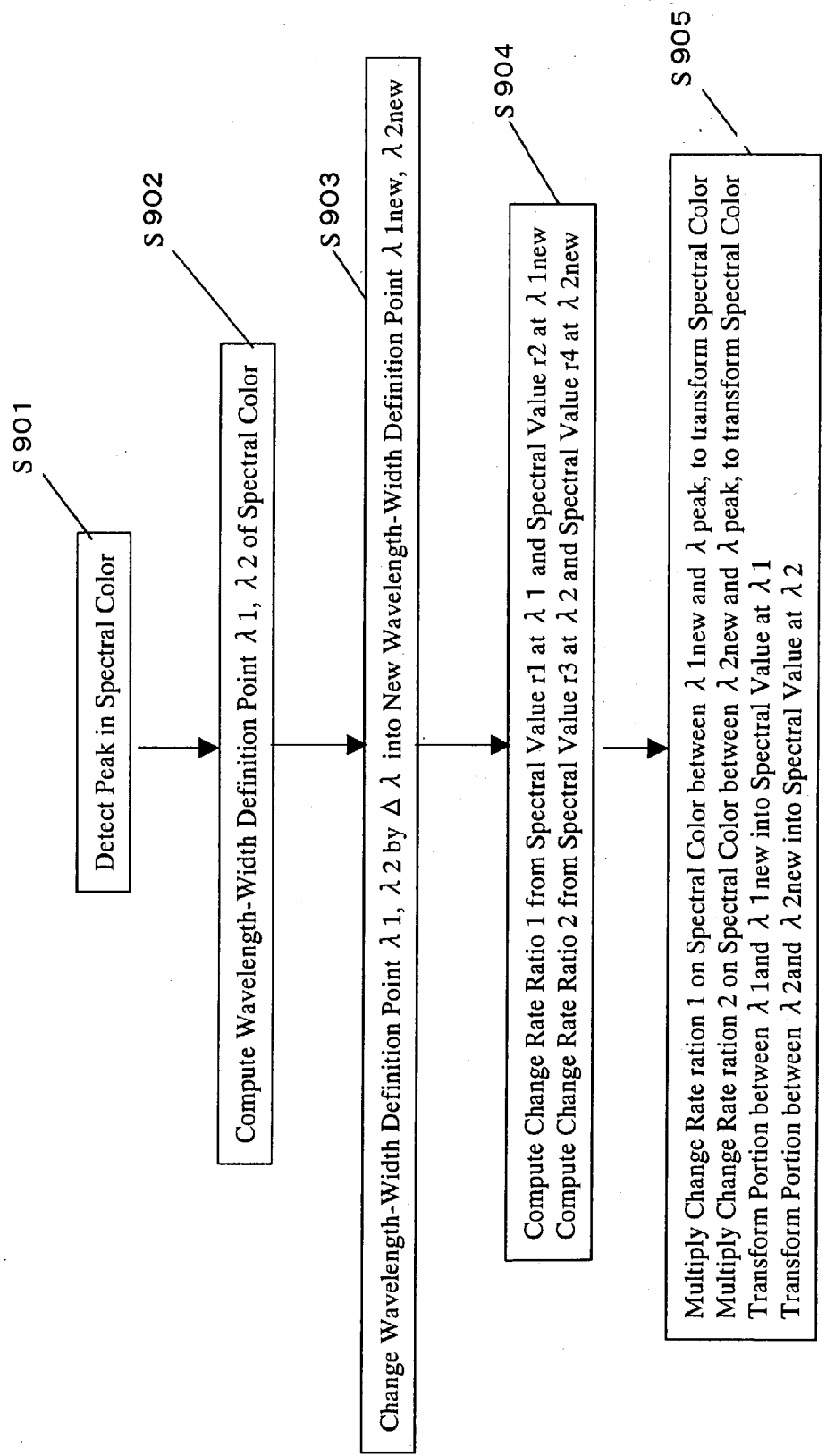
FIG. 9 is a flowchart showing an operation procedure of a spectral color-editing section according to embodiment 1 of the invention.

The flowchart of the operation of the spectral-color editing section 122 is shown in FIG. 9. In step 901, a peak 805 is detected on the spectral color. Although there exist several detecting methods, secondary differential values are sequentially determined on the spectral color to take, as a peak, a point having a greatest spectral value among the maximum points having approximate values to 0. In step 902, determined is a wavelength-width defining point 803 defining a wavelength width. The wavelength-width defining point 803 comprises λ1 and λ2. These may be obtained by determining two minimal points surrounding the peak.

In step 903, the wavelength width defining points are moved by Δλ from λ1, λ2 toward the peak center, to have new wavelength width definition points 804. The value Δλ differs depending upon the amount of a user's designation in the spectral purity designate window 207. The value Δλ may be increased with increase of the saturation in + direction. The new wavelength width definition points 804 are respectively referred to as λ1 new and λ2new.

In step 904, a spectral value r1 at λ1 and a spectral value r2 at λ1new are determined, to compute a ratio value, ratio1, the spectral value is varied by the ratio r1 /r2. On λ2 and λ2 new, a variation ratio value, ratio2, is determined.

In step 905, the spectral value of the current spectral color of from λ1 new to λpeak is multiplied by a weight linearly assigned for ratio1 at λ1 new and 1 at λpeak, thereby transforming the spectral value. The spectral value of from λpeak to λ2 new is similarly transformed by the use of ratio2. At the remaining portion at between λ1 and λ1 new, transformation is into a spectral value at λ1 . Similarly, transformation at the portion between λ2 and λ2 new, is made into a spectral value at λ2. For the remaining portion of wavelength, the spectral value of the former spectral color is not directly changed.

By the above procedure, determined is a new spectral color the current spectral color is narrowed in waveform width.

In the present process, however, color purity increases but lightness decreases. Accordingly, the user may separately designate a lightness by changing the lightness. Otherwise, in step 905, lightness may be automatically raised to assign a value such that the weight at λpeak is equal to or greater than 1.

Besides the above method, there is a method that, in order for transformation into a spectral color narrow in peak width, the pre-edit spectral color is first approximated by a spline curve and then control is made for that control point.

Although, in the above explanation of the embodiment, a spectral color to be determined is based on spectral reflectance, editing is possible for spectral radiance, spectral radiant intensity or spectral transmittance by the similar method.

Incidentally, the operation of the color-editing apparatus of FIG. 1 may be stored on a CDROM so that the program stored on the CDROM can be downloaded to a RAM of a personal computer, whereby color-editing process can be made by a CPU of the personal computer.

As described above, according to the present embodiment, when editing a spectral color, the spectral color is previously transformed into a lower-dimensional color space easy for the human to make editing. Editing is carried out in the color space easy for the human to handle, to generate a proper spectral color from the post-edit color space. This makes it possible to carry out spectral-color editing in a simple way.

2. Second Exemplary Embodiment

Embodiment 1 explained the example of color-editing that a spectral color is transformed into an HLS-color space, i.e. a color space having lower dimensions than the former dimensions and easy for the human to handle, thereby effecting color editing. Embodiment 2 explains a case using, as a readily understandable color space for the human, an L*a*b* space in place of the HLS space.

Figure 10:
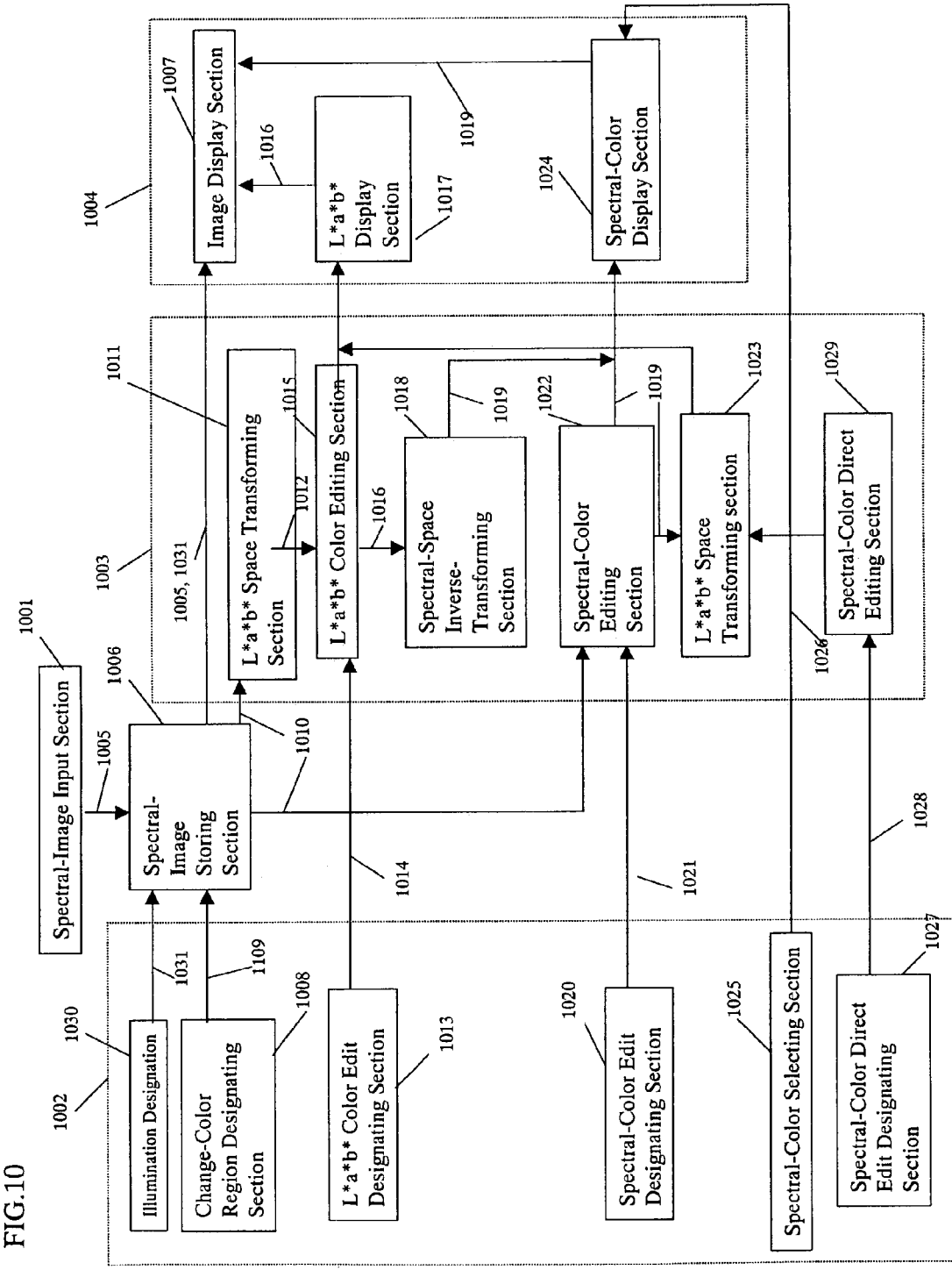
FIG. 10 is a block diagram of a color-editing apparatus according to embodiment 2 of the present invention.

FIG. 10 is a block diagram of a color-editing apparatus for spectral images according to Embodiment 2. The color-editing apparatus is configured with a spectral image input section 1001 for inputting a spectral image, a user interface 1002 for editing a spectral image, a color-editing section 1003 for receiving an instruction from the user interface section 1002 and carrying out color-editing, a display section 1004 for displaying a color-space coordinate value and spectral image as a result of the editing by the color-editing section 1003, and a spectral-image storing section 1006 for storing an input spectral image.

The user interface section 1002 is configured with a change-color region designating section 1008 for designating a region the user desires to change the color in a spectral image 1005, an L*a*b* color-edit designating section 1013 as an interface for the user to edit a color in L*a*b* space representation, a spectral-color edit designating section 1020 as an interface for the user to directly edit an input spectral color 1010, a spectral selecting section 1025 as an interface for the user to select, when there are a plurality of outputs of the spectral-space inverse-transforming section 1018 and a plurality of spectral colors are displayed on a spectral-color display section 1024, any of those, a spectral-color direct edit designating section 1027 for the user to directly operate the values of spectral color and output a designation, and an illumination designating section 1030.

The color-editing section 1003 is configured with an L*a*b* space transforming section 1011 for transforming a to-be-changed spectral color 1010 into a three-dimensional color space of L*a*b*, an L*a*b* color editing section 1015 for edit-processing an input color 1012 in L*a*b* representation according to an L*a*b* edit instruction 1014, a spectral-space inverse-transforming section 1018 for transforming a post-edit L*a*b* color into a spectral value, a spectral-color editing section 1022 for edit-processing a spectral color 1010 according to a spectral edit instruction 1021, an L*a*b* space transforming section 1023 for transforming a post-edit spectral color into a color value in L*a*b* space representation, and a spectral-color direct editing section 1029 for reflecting a user's direct edit designation on spectral color.

The display section 1004 is configured with an image display section 1007 for displaying a spectral image reflecting an input spectral image 1005 and edited color, an L*a*b* display section 1017 for displaying a color in L*a*b* representation, and a spectral-color display section 1024 for displaying a color in spectral representation.

Figure 11:
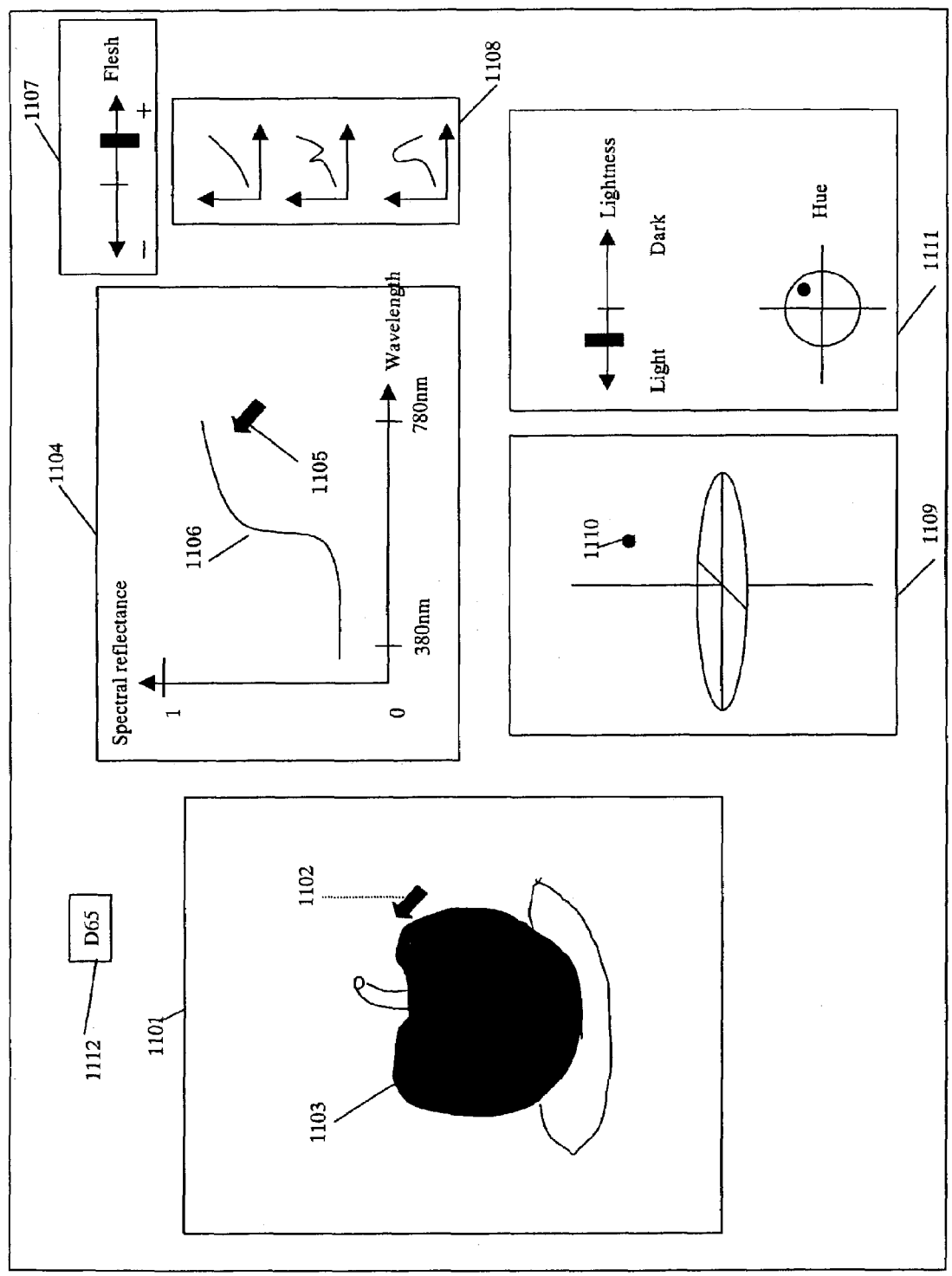
FIG. 11 is a concept diagram showing a display example of the color-editing apparatus according to embodiment 2 of the invention.

Now, the operation of the color-editing apparatus of FIG. 10 is explained together with FIG. 11. At first, a spectral image 1005 to be color-edited is inputted at the spectral-image input section 1001 and stored to the spectral-image storing section 1006. Although the present embodiment explains an example the spectral image is based on a spectral reflectance, the similar method can be applied for the case with spectral radiance, spectral radiant intensity or spectral transmittance.

The spectral reflectance stored in the spectral-image storing section 1006 is multiplied by an illuminant spectral distribution designation by the illumination designating section 1030 through the image display section 1007, and transformed into a spectral radiance. It is further processed taking account of a display color characteristic, and then displayed as a spectral image 1101 of FIG. 11 on the display.

The user designates in what region or pixel he or she desires to change a color of the spectral image 1005, by the change-color region designating section 1008. Specifically, in case the spectral image 1101 is dragged by a change-color region designating cursor 1102 in FIG. 11, a change-color region signal 1109 designating a relevant region or pixel is issued from the change-color region designating section 1008 and read as a change-color region 1103 into the spectral-image storing section 1006. The user, in case designating a region, designates also a pixel to be considered a representative color within the region.

The spectral color 1010, an output of the spectral-image storing section 1006, is a spectral reflectance comprising 31-dimensional vector values sampled at an interval of 10 nm over a visible portion of from 380 nm to 780 nm, on the designated pixel or pixel of a designated region. This is inputted to the spectral-color editing section 1022. Then, the spectral color of the designated pixel, or representative pixel in the designated region, is displayed as a spectral color 1106 in the spectral-color display 1104 of FIG. 11 of the display through the spectral-color display section 1024.

The spectral color 1010 is further inputted also to the L*a*b* space transforming section 1011. The L*a*b* space transforming section 1011 transforms the spectral color into an L*a*b* space, i.e. a reduced-dimensional color space, and outputs an L*a*b* color 1012. The outputted L*a*b* color 1012 is displayed, as an L*a*b* color 1110 in L*a*b* display 1109 of FIG. 11, on the display through the L*a*b* color editing section 1015 and L*a*b* display section 1017.

Equation 1 shows a transforming formula of from a spectral reflectance into an L*a*b*. By these, an XYZ tri-stimulus value is first determined. Next, L*a*b* is determined from the XYZ tri-stimulus value. (Xn, Yn, Zn) is a reference white, i.e. an XYZ tri-stimulus value of the illuminant.

Herein, in Equation 1, r(λ) is a spectral radiance obtained by multiplying a spectral color of a designated illumination 1031 on a spectral reflectance.

By the above process, at first a to-be-changed color is displayed in two kinds of color spaces of a spectral color and an L*a*b* color, on the display of FIG. 11.

Now, explanation is made on a case to edit a current spectral color being displayed. Editing the waveform in the spectral color display 1104 of FIG. 11 by the use of a spectral-color direct editing cursor 1105, the user directly edits multi-dimensional information at from 380 nm to 780 nm, which is one method.

In the block diagram of FIG. 10, the editing made by the spectral-color direct editing cursor 1105 is outputted as a spectral direct edit designating signal 1028, i.e. a signal from the spectral-color direct edit designating section 1027, and inputted to the spectral-color direct editing section 1029. In the spectral-color direct editing section 1029, the current spectral color 1010 is processed as per the edit designation and outputted as a post-edit spectral color 1019.

Then, the post-edit spectral color 1019 will be displayed in place of the current spectral color 1010 in the spectral color display 1104 on the display, by the spectral color display section 1024. In this case, if there are a plurality of outputs of the spectral-space inverse-transforming section 1018 and a plurality of spectral colors are displayed on the spectral-color display section 1024, the user is able to select which spectral-color may be edited by operating the spectral-color selecting section 1025. The spectral-color selecting section 1025 outputs a spectral-color select designation signal 1026 to the spectral-color display section 1024, and a spectral-color to be edited is selected. The post-edit spectral color 1019 is transformed into an L*a*b* color space by the L*a*b* space transforming section 1023, and displayed in the L*a*b* display window 1109 of the display through the L*a*b* display section 1017.

In the case the change-color is designated as a region, the editing of a representative color is exerted similarly onto the other pixels within the region. This rewrites the color in the change-region of the spectral image 1101 into a post-edit color.

The L*a*b* display window 1109 of FIG. 11 displays a current L*a*b* color 1110. Herein, one method is to drag the L*a*b* color by the mouse to a preferable L*a*b* coordinate value. Otherwise, in the L*a*b* color edit designate 1111, the bar on each L*a*b* axis is moved thereby effecting editing. When the change-color is designated as a region, in case a representative color is edited in this manner, the editing content is similarly exerted to the L*a*b* values on the other pixels within the region.

Explanation is made on a method to realize the above-discussed operation over the block diagram of FIG. 10. In FIG. 10, the editing information provided in the L*a*b* space by the user is outputted as an L*a*b* edit designation 1014 from the L*a*b* color edit designating section 1013. In the L*a*b* color-editing section 1015, the color is actually changed, i.e. the display of a spectral image 1101 and L*a*b* display window 1109 is rewritten through the L*a*b* display section 1017.

Simultaneously, a post-edit L*a*b* color 1016 is inputted to the spectral-space inverse-transforming section 1018 where it is inverse-transformed into a spectral color. This rewrites the spectral color 1106 in the spectral-color display window 1104 on the display.

In this case, the post-edit L*a*b* color 1016 is three-dimensional information whereas the spectral color is 31-dimensional. This results in an ill-condition problem that the operation of the spectral-space inverse-transforming section 1018 is not to be determined unambiguously. For this reason, the spectral-space inverse-transforming section 1018 displays a plurality of calculated solutions in the spectral-selection display window 1108. In case the user selects a desired one of a plurality of spectral colors on display, it is provided as a post-edit spectral color 1019 to be displayed in the spectral-color display window 1104.

By the above operation, the user is allowed to edit a spectral image color in a three-dimensional space easy for the human to recognize. However, because the L*a*b* value varies depending upon a designated illumination, the edit process is carried out while making sure of the colors under a certain number of illuminations by the illumination select window 1112.

The color edit process by the user is preferably carried out by previously editing the image color in the L*a*b* spaces under a certain number of illuminations and making a spectrally fine adjustment on it by the spectral-color direct edit cursor 1105.

As for the operation of the spectral-space inverse-transforming section 1018, in case HLS is replaced with an L*a*b* value on the inverse-transforming algorism disclosed in embodiment 1, inverse transformation can be realized by the similar operation.

Meanwhile, in order to change a spectral color into a spectral form narrow in wavelength width and enhance the saturation of color, the spectral-purity designate 1107 may be operated quite similarly to the operation of the spectral-purity designate 107 in embodiment 1.

Although, in the above explanation of the embodiment, a spectral color to be determined is based on spectral reflectance, editing is possible based on spectral radiance, spectral radiant intensity or spectral transmittance by the similar method.

In embodiment 2, the operation of the color-editing apparatus of FIG. 10 may be stored on a CDROM so that the program stored on the CDROM can be downloaded to a RAM of a personal computer, whereby color-editing process can be made by a CPU of the personal computer.

As described above, according to the present embodiment, when editing a spectral color, the spectral color is previously transformed into a lower-dimensional color space easy for the human to make editing. The human makes editing in the low-dimensional color space, to generate a proper spectral color from a post-edit color space. This makes it possible to carry out spectral-color-editing in a simple way.

3. Third Exemplary Embodiment

Embodiment 3 explains a color-editing apparatus which carries out preferable color correction on a spectral image obtained from an image input unit by estimation, followed by outputting.

Figure 12:
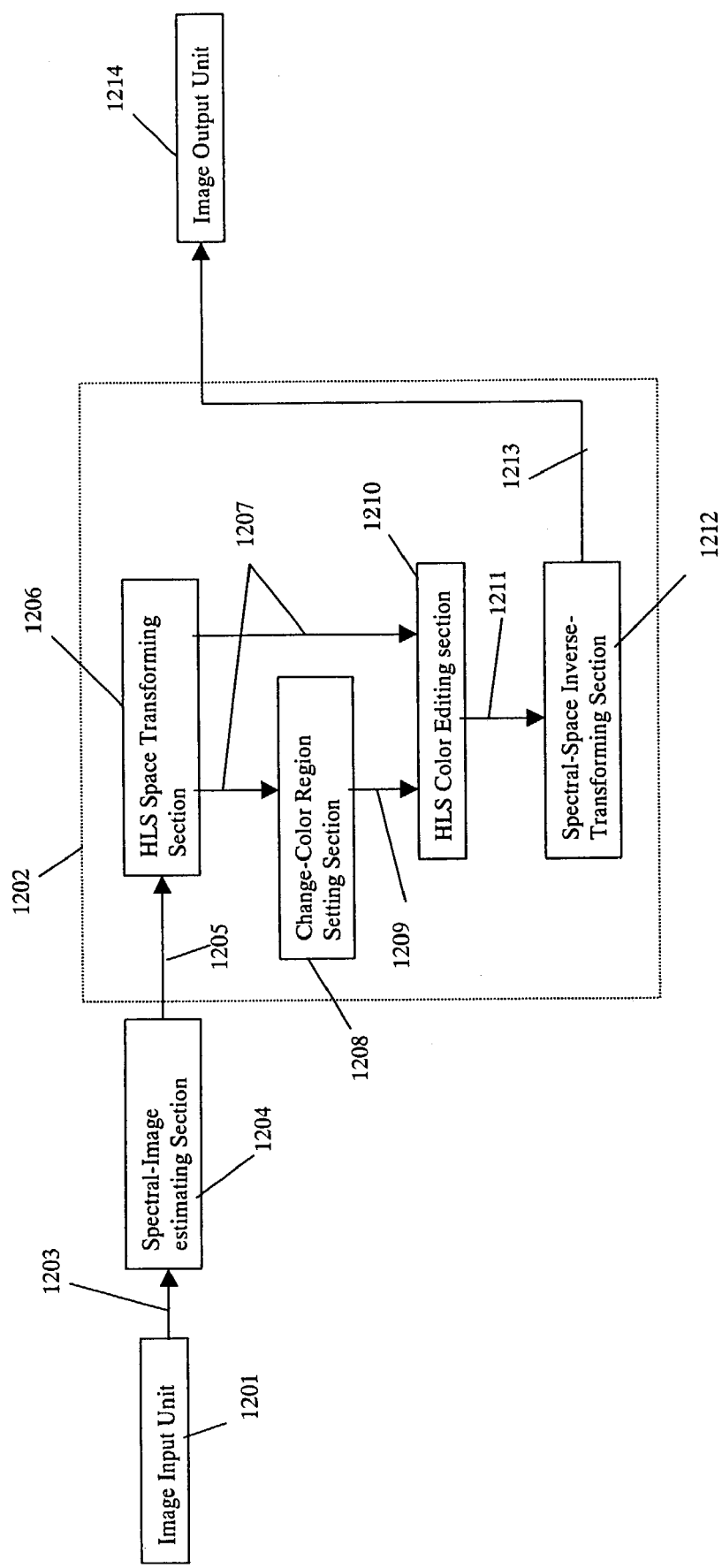
FIG. 12 is a block diagram of a color-editing apparatus according to embodiment 3 of the present invention.

FIG. 12 is a block diagram of a color-editing apparatus for spectral images according to embodiment 3. In FIG. 12, the color correcting apparatus is configured with an image input unit 1201 of a digital still camera, digital movie, multi-spectrum camera, hyper-spectrum camera or the like, a spectral-image estimating section 1204 for estimating a spectral image 1205 from an input image, a color correcting unit 1202 and an image output unit 1214 of a display, printer or the like for outputting or displaying a processed spectral image.

The color correcting unit 1202 is configured with an HLS space transforming section 1206 for transforming a pixel value of spectral image into an HLS space, a change-color region setting section 1208 for setting a to-be-changed color in a region of HLS image higher in saturation than a predetermined threshold, an HLS-color editing section 1210 for carrying out color-editing to increase a saturation value in a change-color region 1209 of HLS image, and a spectral-space inverse-transforming section 1212 for inverse-transforming the pixels of processed HLS image into the former spectral space.

Now, the operation is explained. An input image 1203 is inputted from the image input unit 1201 to the spectral-image estimating section 1204. The spectral-image estimating section 1204 estimates a spectral image 1205 from the input image 1203. The HLS space transforming section 1206 transforms the pixels of spectral image into a lower-dimensional HLS space by Equation 1, thus computing an HLS image 1207.

The change-color region setting section 1208 sets and outputs, as a change-color region 1209, a pixel of HLS image 1207 having a saturation C higher than a predetermined threshold. $C_{thre}$ The HLS-color editing section 1210 adds a predetermined amount ΔC of saturation to the saturation on the pixel set as a change-color region 1209. In this case, the value ΔC is provided 0 when pixel saturation is approximate to $C_{thre}$ and increased with the increase thereof, thereby enabling natural saturation transformation.

The spectral-space inverse-transforming section 1212 inverse-transforming the processed HLS image 1211 outputted from the HLS-color editing section 1210 into a higher-dimensional spectral space, and outputs an obtained image as a processed spectral image 1213 to the image output unit 1214. The operation of the spectral-space inverse-transforming section 1212 is similar to the operation of the spectral-space inverse-transforming section 118 explained in embodiment 1.

Now, explanation is made on the detailed operation of the spectral-image estimating section 1204. Provided that an input image is RGB, the RGB signal and the spectral reflectance have the relationship of Equation 14.

$$R' = \int C_R(\lambda) S(\lambda) r(\lambda) d\lambda$$

$$G' = \int C_G(\lambda) S(\lambda) r(\lambda) d\lambda$$

$$B' = \int C_B(\lambda) S(\lambda) r(\lambda) d\lambda \qquad \text{Equation 14}$$

In Equation 14, (R', G', B') is an RGB signal excluded of non-linearity from an actual camera signal (R, G. B), S(λ) is a spectral distribution of illuminant, $C_i(\lambda)$ (i=R, G, B) is a spectral sensitivity of each filter of a camera, and r(λ) is a spectral reflectance to be determined.

In case the spectral reflectance is expressed by preset three basis functions $O_i(\lambda)$ (i=1, 2, 3), Equation 14 can be written as Equation 15. The problem seeking a spectral reflectance turns to a problem seeking basis coefficients (a, b, c).

$$R' = \int C_R(\lambda) S(\lambda)(a \cdot O_1(\lambda) + b \cdot O_2(\lambda) + c \cdot O_3(\lambda)) d\lambda$$

$$G' = \int C_G(\lambda) S(\lambda)(a \cdot O_1(\lambda) + b \cdot O_2(\lambda) + c \cdot O_3(\lambda)) d\lambda$$

$$B' = \int C_B(\lambda) S(\lambda)(a \cdot O_1(\lambda) + b \cdot O_2(\lambda) + c \cdot O_3(\lambda)) d\lambda \qquad \text{Equation 15}$$

The basis function, usually, uses higher-ranking three vectors obtained by principal-component analysis on the spectral reflectance of various objects existing in the natural world. Because Equation 15 if rewritten in discrete expression provides Equation 16, (a, b, c) can be determined from (R', G', B') by an inverse matrix to the matrix B. Herein, the matrix B is an arrangement of a matrix comprising spectral sensitivity, illuminant spectral color and basis functions.

$$\begin{pmatrix} R' \\ G' \\ B' \end{pmatrix} = B \begin{pmatrix} a \\ b \\ c \end{pmatrix} \qquad \text{Equation 16}$$

From the obtained basis functions, a spectral reflectance can be determined by Equation 17.

$$r(\lambda) = a \cdot O_1(\lambda) + b \cdot O_2(\lambda) + c \cdot O_3(\lambda) \qquad \text{Equation 17}$$

By carrying out the above process on each of the pixels of input image, a spectral image 1205 can be estimated.

In embodiment 3, the operation of the spectral-image estimating section 1204 and color-editing unit 1202 of FIG. 12 may be stored on a CDROM so that the program stored on the CDROM can be downloaded to a RAM of a personal computer, whereby color-editing process can be made by a CPU of the personal computer. Otherwise, the operation of the spectral-image estimating section 1204 and color correcting unit 1202 may be processed by being incorporated in the image input unit or image output unit.

As described above, according to the present embodiment, when color-editing a spectral image fresher, the spectral image is first transformed into a lower-dimensional color space. By color-correcting for the saturation in the low-dimensional space and then inverse-transformation into a spectral image, the spectral image can be simply color-corrected to a preferred image.

4. Fourth Exemplary Embodiment

Embodiment 4 explains a color-editing apparatus for carrying out preferable color correction on a spectral image obtained from an image input unit by estimation followed by outputting, similarly to Embodiment 3.

Figure 13:
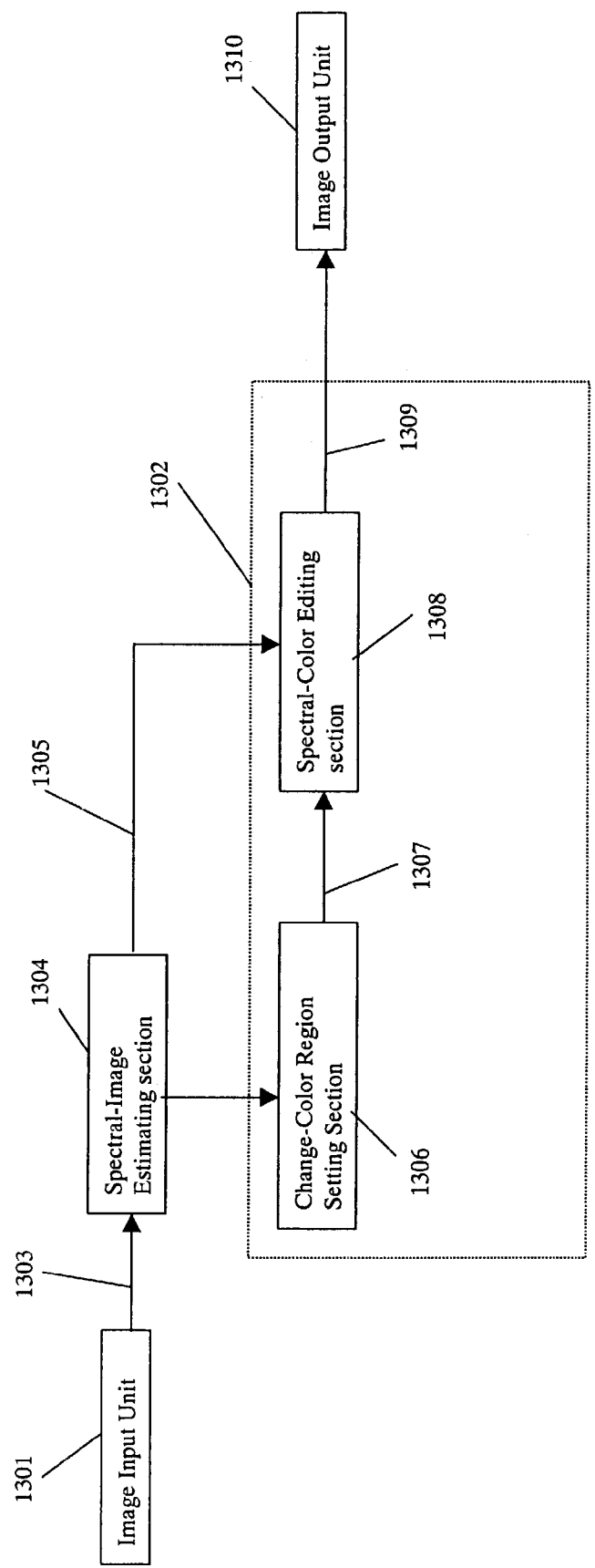
FIG. 13 is a block diagram of a color-editing apparatus according to embodiment 4 of the present invention.

FIG. 13 is a block diagram of a color-editing apparatus for spectral images according to embodiment 4. In FIG. 13, the color correcting apparatus is configured with an image input unit 1301 of a digital still camera, digital movie, multi-spectrum camera, hyper-spectrum camera or the like, a spectral-image estimating section 1304 for estimating a spectral image from an input image, a color correcting unit 1302 and an image output unit 1310 of a display, printer or the like for outputting or displaying a processed spectral image 1309.

The color correcting unit 1302 is configured with an HLS space transforming section 1306 for transforming the pixel value of spectral image into an HLS space, and a spectral color editing section 1308 for carrying out spectral color-editing to increase a saturation value in a change-color region 1307 of spectral image.

Now, the operation is explained. An input image 1303 is inputted from the image input unit 1301 to spectral-image estimating section 1304. The spectral-image estimating section 1304 estimates a spectral image 1305 from the input image 1303. The detailed operation thereof is similar to that of spectral image estimating section 1204 of FIG. 12 explained in embodiment 3.

The change-color region setting section 1306 sets and outputs, as a change-color region 1307, a spectral-color pixel having a conspicuous peak. The spectral color having a conspicuous peak is obtained by calculating a secondary differential value of spectral color and determining a maximum/minimum value from the secondary differential value. Nevertheless, in case a maximum point great in spectral reflectance is determined and the two minimum points surrounding them have a width fallen within a predetermined threshold, then determination is as having a conspicuous peak.

The spectral color-editing section 1308 saturation-transforms the spectral color of pixel set as a change-color region 1307 into a color narrower in peak width and higher in purity. The detailed operation thereof is similar to spectral color-editing section 122 of FIG. 1 explained in embodiment 1. The obtained image is outputted as a processed spectral image 1309 to the image output unit 1310.

In this embodiment 4, the operation of the spectral-image estimating section 1304 and color-editing unit 1302 of FIG. 13 may be stored on a CDROM so that the program stored on the CDROM can be downloaded to a RAM of a personal computer, whereby color-editing process can be made by a CPU of the personal computer. Otherwise, the operation of the spectral-image estimating section 1304 and color correcting unit 1302 may be processed by being incorporated in the image input unit or image output unit.

As described above, according to the present embodiment, when color-correcting a spectral image fresher, the spectral image is changed to a form narrow in wavelength width. Due to this, the spectral image can be simply color-corrected to a preferred image.

What is claimed is:

1. A color editor for color-editing a spectral value and expressing a color in a spectral fashion, comprising:
   a color space transforming section for transforming the spectral value into a color space, wherein the color space has fewer dimensions than the spectral value;
   a color-editing section for color-editing a color of the spectral value in the color space transformed by the color space transforming section; and
   a color space inverse-transforming section for transforming the edited color from the color space into a new spectral value which has more dimensions than the color space using a plurality of inverse-transforming algorithms and selecting from a plurality of spectral solutions.

2. A color editor according to claim 1, wherein spectral value comprises any of spectral reflectance, spectral transmittance, spectral radiation luminance and spectral luminosity.

3. A color editor according to claim 1, wherein the color space easy for the human to handle comprises three components of hue, saturation and lightness.

4. A color editor according to claim 1, wherein the color space inverse-transforming section outputs, as a new spectral value, a spectral value having a form closest to a pre-edit spectral value of among spectral values realizing a color of an edited color space.

5. A color editor according to claim 1, wherein the color space inverse-transforming section outputs, as a new spectral value, a spectral value closest to a pre-edit spectral value and having a smooth form of among spectral values realizing a color of an edited color space.

6. A color editor according to claim 1, wherein the color space inverse-transforming section outputs, as a new spectral value, a spectral value smallest in spectral Euclidean distance to a pre-edit spectral value of among spectral values realizing a color of an edited color space.

7. A color editor according to claim 1, wherein the color space inverse-transforming section outputs, as a new spectral value, a spectral value multiplied of a pre-edit spectral value by a weight comprising consecutive numerals of among spectral values realizing a color of an edited color space.

8. A color editor according to claim 1, wherein the color space inverse-transforming section first determines an XYZ tri-stimulus value from a color of an edited color space and outputs, as a new spectral value, a spectral value satisfying the XYZ tri-stimulus value.

9. A color editor according to claim 1, wherein the color space inverse-transforming section first determines an XYZ tri-stimulus value from a color of an edited color space, and determines and outputs, as a new spectral value, a spectral value from the XYZ tri-stimulus value by a generalized inverse matrix of a color matching function.

10. A color editor according to claim 1, wherein the color space inverse-transforming section determines an XYZ tri-stimulus value from a color of an edited color space, determines a coefficient to a base of a previously prepared spectral value from the XYZ tri-stimulus value, and computes and outputs, as a new spectral value, a spectral value from the basic coefficient.

11. A color editor according to claim 1, wherein the color space inverse-transforming section narrows a wavelength width of spectral value for an edit instruction to increase saturation.

12. An apparatus for color-editing a spectral value expressing a color in a spectral fashion, comprising:
   a color space transforming section for transforming the spectral value into a color space, wherein the color space has fewer dimensions than the spectral value;
   a color-editing section for the user to color-edit a color of the spectral value in the color space transformed by the color space transforming section;
   a color space inverse-transforming section for transforming the edited color from the color space into a new spectral value which has more dimensions than the color space usino a plurality of inverse-transforming algorithms and selecting from a plurality of spectral solutions; and
   a spectral selecting section for selecting one solution desired by a user from the plurality of solutions outputted by the color space inverse-transforming section.

13. An apparatus according to claim 12, wherein an image to be color-edited is a spectral image having, as a pixel value, a spectral value expressing a color in a spectral fashion, and further including a subject-of-editing image display section for displaying the spectral image as an image of under a light source designated.

14. An apparatus according to claim 13, further including a change-color region designating section for selecting a point to be edited on a spectral image displayed in the subject-of-editing image display section, and a spectral value display section for displaying as a graph a spectral value of a color selected.

15. An apparatus according to claim 12, further including a corresponding-color display section for displaying, at least one, a corresponding color of spectral value as a color space easy for the human to handle.

16. An apparatus according to claim 14, wherein the spectral value display section displays a graph on a color purity of spectral value, and further including a user color-purity editing section for the user to edit a color-purity of the spectral value.

17. An apparatus according to claim 12, further comprising a user color-purity editing section for the user to edit a color purity of spectral value, wherein the color space inverse-transforming section transforms an edited color in the color space by a user's designation outputted from the color-editing section and user color-purity editing section into a new spectral value which has more dimensions than the color space and outputs a plurality of solutions.

18. An apparatus according to claim 17, wherein the color space inverse-transforming section changes a wavelength width of spectral value in the case the user edits a color purity by the user color-purity editing section.

19. An apparatus according to claim 16, wherein a color edited by the color-editing section and user color-purity editing section and a color selected by the spectral selecting section are displayed on the subject-of-editing image display section.

20. An apparatus according to claim 16, wherein a color edited by the color-editing section and user color-purity editing section and a color selected by the spectral selecting section are displayed in the spectral value display section.

21. An apparatus according to claim 16, wherein a color edited by the color-editing section and user color-purity editing section and a color selected by the spectral selecting section are displayed in the corresponding-color display section.

22. A method for color-editing a spectral value expressing a color in a spectral fashion, including:
   a first step of transforming the spectral value into a color space, wherein the color space has fewer dimensions than the spectral value;
   a second step for a user to color-edit a color of the spectral value in the a color space transformed by the color space transforming; and
   a third step of inverse-transforming a color of edited color space into a new spectral value which has more dimensions than the color space using a plurality of inverse-transforming algorithms and selecting from a plurality of spectral solutions.

23. A method according to claim 22, wherein spectral value comprises any of spectral reflectance, spectral transmittance, spectral radiation luminance and spectral luminosity.

24. A method according to claim 22, wherein the color space easy for the human to handle comprises three components of hue, saturation and lightness.

25. A method according to claim 22, wherein the third step is to output, as a new spectral value, a spectral value closest to a pre-edit spectral value and having a smooth form of among spectral values realizing a color of an edited color space.

26. A method according to claim 22, wherein the third step is to output, as a new spectral value, a spectral value closest in spectral Euclidean distance to a pre-edit spectral value of among spectral values realizing a color of an edited color space.

27. A method according to claim 22, wherein the third step is to output, as a new spectral value, a spectral value multiplied of a pre-edit spectral value by a weight comprising consecutive numerals of among spectral values realizing a color of an edited color space.

28. A method according to claim 22, wherein the third step is to first determine an XYZ tri-stimulus value from a color of an edited color space and output, as a new spectral value, a spectral value satisfying the XYZ tri-stimulus value.

29. A method according to claim 22, wherein the third step is to first determine an XYZ tri-stimulus value from a color of an edited color space, and determine and output, as a new spectral value, a spectral value from the XYZ tri-stimulus value by a generalized inverse matrix of a color matching function.

30. A method according to claim 22, wherein the third step is to determine an XYZ tri-stimulus value from a color of an edited color space, and determine and output, as a new spectral value, a coefficient to a case of a previously prepared spectral value, and compute a spectral value from the basic coefficient.

31. A method according to claim 22, wherein the third step includes a step of narrowing a wavelength width of a spectral value for an edit designation to increase saturation.

32. A color corrector comprising:
   an HLS space transforming section for transforming a spectral image into a low-dimensional HLS space image, a setting section for setting as a color-change region a pixel having a saturation equal to or higher than a threshold previously determined from the HLS space image, an editing section for adding a saturation of a pixel having a saturation equal to or higher than the threshold with a predetermined saturation thereby effecting saturation-transforming, and an inverse-transforming section for inverse-transforming an image saturation-transformed into a spectral space which has more dimensions than the HLS space using a plurality of inverse-transforming algorithms and selecting from a plurality of spectral solutions.

33. A color corrector according to claim 32, wherein the predetermined saturation is 0 when the saturation is close to the threshold and increased when greater than the threshold.

* * * * *

UNITED STATES PATENT AND TRADEMARK OFFICE
CERTIFICATE OF CORRECTION

| | |
|---|---|
| PATENT NO. | : 7,312,899 B2 |
| APPLICATION NO. | : 10/420381 |
| DATED | : December 25, 2007 |
| INVENTOR(S) | : Nichogi |

Page 1 of 1

It is certified that error appears in the above-identified patent and that said Letters Patent is hereby corrected as shown below:

On the Title page, item (56) References Cited, please insert:

--FOREIGN PATENT DOCUMENTS
  WO    97/10528         3/1997--

In column 21, line 19 of the Letters Patent, in claim 22 (Amendment claim 22), "value in the a color space" should read --value in the color space--.

Signed and Sealed this

Twenty-sixth Day of August, 2008

JON W. DUDAS
*Director of the United States Patent and Trademark Office*